United States Patent
Puzak et al.

(10) Patent No.: US 6,560,693 B1
(45) Date of Patent: *May 6, 2003

(54) BRANCH HISTORY GUIDED INSTRUCTION/DATA PREFETCHING

(75) Inventors: Thomas R. Puzak, Ridgefield, CT (US); Allan M. Hartstein, Chappaqua, NY (US); Mark Charney, Millwood, NY (US); Daniel A. Prener, Croton-on-Hudson, NY (US); Peter H. Oden, Ossining, NY (US); Vijayalakshmi Srinivasan, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/459,739

(22) Filed: Dec. 10, 1999

(51) Int. Cl.$^7$ .............................. G06F 15/00; G06F 9/30; G06F 9/40
(52) U.S. Cl. ..................... 712/207; 712/205; 712/237; 712/239; 712/240; 717/127; 717/131
(58) Field of Search ............................... 712/207, 205, 712/206; 717/159, 157, 161

(56) References Cited

U.S. PATENT DOCUMENTS

| | | |
|---|---|---|
| 5,305,389 A | 4/1994 | Palmer |
| 5,357,618 A | 10/1994 | Mirza et al. |
| 5,704,053 A | 12/1997 | Santhanam |
| 5,732,242 A | 3/1998 | Mowry |
| 5,742,804 A | 4/1998 | Yeh et al. |
| 5,774,685 A | 6/1998 | Dubey |
| 5,778,435 A | 7/1998 | Berenbaum et al. |
| 5,809,566 A * | 9/1998 | Charney et al. ............ 711/204 |
| 5,838,945 A | 11/1998 | Emberson |
| 5,854,934 A | 12/1998 | Hsu et al. .................... 395/709 |
| 5,896,517 A | 4/1999 | Wilson |
| 5,918,246 A | 6/1999 | Goodnow et al. |
| 5,919,256 A | 7/1999 | Widigen et al. |
| 6,055,621 A | 4/2000 | Puzak |
| 6,065,115 A * | 5/2000 | Sharangpani et al. ....... 712/217 |
| 6,212,603 B1 * | 4/2001 | McInerney et al. ......... 711/125 |

OTHER PUBLICATIONS

Puzak et al. Branch History Guided Instruction Prefetching, High–Performance Computer Architecture, 2001. HPCA. The Seventh International Symposium on, 2001. pp. 291–300.*

Lilja, "Reducing the Branch Penalty in Pipelined Processors", Computer, vol.: 21 Issue: 7, Jul. 1988, pp. 47–55.*

Veidenbaum; Instruction Cache Prefetching Using Multi-level Branch Prediction:(pp. 51–70), in High Performance Computing, Lecture Notes in Computer Science, vol.1336, 1997.

"Branch–Directed and Stride–Based Data Cache Prefetching", Yue Liu and David R. Kaeli, Prceedings of the International Conference on Computer Design (pp. 225–229), 1996.

"Software Prefetching" by Callahan et al, in the Procedings of the Fourth International Conference on Architectural Support For Programming Languages and Operating Systems(pp. 40–52), Apr. 1991.

* cited by examiner

Primary Examiner—Kakali Chaki
Assistant Examiner—William H Wood
(74) Attorney, Agent, or Firm—Michael J. Buchenhorner; Casey P. August

(57) ABSTRACT

A mechanism is described that prefetches instructions and data into the cache using a branch instruction as a prefetch trigger. The prefetch is initiated if the predicted execution path after the branch instruction matches the previously seen execution path. This match of the execution paths is determined using a branch history queue that records the branch outcomes (taken/not taken) of the branches in the program. For each branch in this queue, a branch history mask records the outcomes of the next N branches and serves as an encoding of the execution path following the branch instruction. The branch instruction along with the mask is associated with a prefetch address (instruction or data address) and is used for triggering prefetches in the future when the branch is executed again. A mechanism is also described to improve the timeliness of a prefetch by suitably adjusting the value of N after observing the usefulness of the prefetched instructions or data.

34 Claims, 18 Drawing Sheets

BRANCH HISTORY GUIDED INSTRUCTION/ DATA PREFETCHING

CROSS-REFERENCE TO RELATED APPLICATIONS

This application relates to subject matter that is similar to that of the copending application having Ser. No. 09/458,883 which was also filed on Dec. 10, 1999 and is assigned to the same entity.

STATEMENT REGARDING FEDERALLY-SPONSORED RESEARCH OR DEVELOPMENT

Not Applicable.

INCORPORATION BY REFERENCE OF MATERIAL SUBMITTED ON A COMPACT DISC

Not Applicable.

BACKGROUND OF THE INVENTION

1. Field of the Invention

The present invention describes a way to conditionally prefetch instruction or data from the memory. In particular, a method and apparatus are disclosed for improving the performance of the cache by using branch prediction information to selectively issue prefetches.

2. Description of Related Art

The current state of computer system technologies is such that processor speeds are increasing at a more rapid rate than main memory speeds. This mismatch between processor speed and main memory speed is being masked by including larger and larger random access "buffers" or "caches" between the processor and main memory.

Data is typically moved within the memory hierarchy of a computer system. At the top of this hierarchy is the processor and at the bottom are the I/O storage devices. The processor is connected to one or more caches (random access buffers). One type of cache is an instruction cache for supplying instructions to the processor with minimal delay. Another type of cache is a high-speed buffer for holding data that is likely to be used in the near future.

Either type of cache can be connected either to other caches or to the main memory of the memory hierarchy. When a program is executed, the processor fetches and executes instructions of the program from the main memory (or an instruction cache). This can cause the processor to request a cache entry or modify or overwrite a cache entry and portions of the main memory.

An illustrative data processing system 100 in accordance with the prior art is shown in FIG. 1. The data processing system 100 has a cache which may consist of only a single cache unit or multiple cache units. The cache may be separated into a data cache 145 and an instruction cache 110 so that both instructions and data may be simultaneously provided to the data processing system 100 with minimal delay. The data processing system 100 further includes a main memory 150 in which data and instructions are stored, a memory system interface 105 which allows the instruction cache 110 and data cache 145 to communicate with main memory 150, an instruction fetch unit 115 for retrieving instructions of an executing program. Further included in the data processing system is a decode and dispatch unit 120 for interpreting instructions retrieved by the instruction fetch unit 115 and communicating the interpreted information to one or more execution units, and a plurality of execution units including a branch unit 125, functional unit 130 and memory unit 140, for using the interpreted information to carry out the instruction. The branch unit 125 is responsible for executing program branches, that is computing modifications to the program counter as a program is executed. The generic functional unit 130 represents one or more execution units that can perform operations such as addition, subtraction, multiplication, division, shifting and floating point operations with various types of data as required. Typically, a processor will have several execution units to improve performance. In this description all branches are sent to the branch unit 125. All other instructions go to the general functional unit 130. This configuration is chosen for simplicity and to present an explicit design. Clearly, many other execution unit configurations are used with general or special purpose computing devices. Associated with each execution unit is an execution queue (not shown). The execution queue holds decoded instructions that await execution. The memory unit 140 is responsible for computing memory addresses specified by a decoded instruction. A register file 135 is also included in the data processing system 100 for temporarily holding data. Of course, other storage structures may be used instead of or in addition to the register file 135, such as those used for dealing with speculative execution and implementation of precise interrupts. A sample register file 135 is described as being illustrative of the storage structures which may be used.

When a program is executed, a program counter or sequence prediction mechanism communicates an instruction address to the instruction fetch 115. The instruction fetch 115, in turn, communicates the instruction address to the instruction cache 110. If the instruction corresponding to the instruction address is already in the instruction cache 110, the instruction cache returns the instruction to the instruction fetch 115. If not, the instruction cache 110 transmits the instruction address to the memory system interface 105. The memory system interface 105 locates the instruction address in main memory 150, and retrieves the instruction stored at that address. The instruction is then delivered to the instruction cache 110, from which it is finally returned to the instruction fetch 115. When the instruction arrives at the instruction fetch 115, it is delivered to the decode and dispatch unit 120 if there is available buffer space within the decode and dispatch unit 120 for holding the instruction. The decode and dispatch unit 120 then decodes information from the delivered instruction, and proceeds to determine if each instruction and associated decoded information can be placed in the execution queue of one of the execution units. The appropriate execution unit receives the instruction and any decoded information from the decode and dispatch unit 120, and then uses the decoded information to access data values in the register file 135 to execute the instruction. After the instruction is executed, the results are written to the register file 135.

In addition to its general function of computing memory addresses, the memory unit 140 is responsible for executing two particular kinds of instructions: load and store.

A load instruction is a request that particular data be retrieved and stored in the register file 135. The memory unit 140 executes a load instruction by sending a request to the data cache 145 for particular data. If the data is in the data cache 145 and is valid, the data cache returns the data to the memory unit. If the data is not in the data cache 145 or is invalid, the data cache 145 accesses a particular data memory address in main memory 150, as indicated by the load instruction, through the memory system interface 105.

The data is returned from main memory 150 to the data cache 145, from which it is eventually returned to the memory unit 140. The memory unit 140 stores the data in the register file 135 and possibly passes it to other functional units 130 or to the branch unit 125. A store instruction is a request that data be written to a particular memory address in main memory 150. For stores, a request is sent by the memory unit 140 to the data cache 145 specifying a data memory address and particular data to write to that data memory address. If the data corresponding to the specified data memory address is located in the data cache 145 and has the appropriate access permissions, that data will be overwritten with the particular data specified by the memory unit 140. The data cache 145 then accesses the specified memory address in main memory 150, through the memory system interface 105, and writes the data to that address.

Focusing on the cache, which may be a data cache 145, an instruction cache 110, or a combined cache, the cache is repeatedly queried for the presence or absence of data during the execution of a program. Specifically, the data cache 145 is queried by the memory unit 140 regardless of whether the memory unit 140 executes a load or store instruction. Similarly, the instruction cache 110 is repeatedly queried by the instruction fetch 115 for a particular instruction.

A cache has many "blocks" which individually store the various instructions and data values. The blocks in a cache are divided into one or more groups of blocks called "congruence classes". For any given memory block there is a unique congruence class in the cache into which the block can be mapped, according to preset mapping functions. The number of blocks in a congruence class is called the associativity of the cache, e.g., 2-way set associative means that, for any given memory block, there are two blocks in the cache into which the memory block can be mapped; however, several different blocks in the next level of memory can be mapped to any given congruence class.

An illustrative cache line (block) includes an address-tag field, a state-bit field, an inclusivity-bit field, and a value field for storing the actual instructions or data. The state-bit field and inclusivity field are used to maintain cache coherency in a multiprocessor data processing system. The address tag is a subset of the full address of the corresponding memory block. A compare match of an incoming address with one of the tags within the address-tag field indicates a cache "hit." On the other hand, a cache "miss" occurs if the requested tag is absent from a cache, or if the tag is in the cache but has the wrong "access permissions". Data may have the wrong access permissions if is being read or written by another data processor in the data processing system when requested. The collection of all the address tags in the cache and the state-bit and inclusivity fields is referred to as a directory, and the collection of all the value fields is the cache-entry array.

If a cache miss occurs, the requested data are retrieved from main memory and inserted into the cache, which may displace other cached data. The delay associated with fetching data from main memory is generally much greater than if the data were already in the cache because main memory does not have the high speed access capabilities of a cache. This delay associated with memory data access is commonly referred to as "access latency" or "latency". In all cases, caches are of finite size. Selectivity must be applied in determining which data should be cached when the cache is full. When all of the blocks in a congruence class are full and the cache receives a request to a memory location that maps into that congruence class, the cache must "evict" one of the blocks currently in the congruence class. The cache chooses a block to be evicted by an algorithm (For example, least recently used (LRU), random, pseudo-LRU, etc.). If the data in the chosen block are modified, those data are written to the next level of memory hierarchy which may be another cache (in the case of primary or on-board caches). By the principle of inclusion, the lower level of hierarchy will already have a block available to hold the written modified data. However, if the data in the chosen block is not modified, the block is simply overwritten. This process of removing a block from one level of hierarchy is known as "castout". At the end of this process, the cache no longer holds a copy of the evicted block.

Since the latency to the memory or the next level of cache hierarchy is generally significantly greater than the time to access the cache, many techniques have been proposed to hide or reduce this latency. Prefetching is one such technique. Prefetching mechanisms attempt to anticipate which sections of memory will be used by a program and fetch them into the cache before the processor would normally request them. If the prefetching mechanism is successful then a line of memory is transferred into the cache far enough ahead, in time, to avoid any processing stalls due to a cache miss.

Prefetching techniques fall into two major categories—hardware-based and software-based. Software based prefetching techniques involve inserting prefetching instructions into a program. For example, the paper "Software Prefetch" by Callahan et al, in the Proceedings of the Fourth International Conference on Architectural Support For Programming Languages and Operating Systems (pp 40–52), April 1991, describes adding new instructions in the instruction set to perform prefetching. Also, the IBM RS/6000 and PowerPC processors have an instruction, the Data-Cache-Block-Touch (dcbt) instruction (commonly called a touch instruction) that prefetches a line of memory into the cache. A compiler (or programmer) can insert these prefetching instructions into the program ahead of the actual use of the data in an attempt to assure that the line of memory will be in the cache when a subsequent instruction in the program is executed. Touch instructions can be used to prefetch instructions and data. For example, a touch instruction can be inserted into a program ahead of an upcoming branch to prefetch the instructions located at the target of the branch. Similarly, a touch instruction can be placed ahead of a load instruction to prefetch the data into the cache.

Hardware-based prefetching techniques rely on predicting future memory-access patterns based on previous patterns. These techniques do not require changes to the existing programs, so there is no need for programmer or compiler intervention. For example, Chen and Bear propose an elaborate approach called, "Lookahead Data Prefetching" in their paper "Reducing Memory Latency via Non-blocking and Prefetching Caches" in the Proceedings of the Fifth International Conference on Architectural Support for Programming Languages and Operating Systems (pp 51–61), October 1992. This technique requires a support unit for a conventional data cache. The support unit is based on the prediction of the execution of the instruction stream and associated operand references in load/store instructions. The latter, and their referencing patterns, are kept in a reference prediction table (RPT) which is organized as a regular cache. An entry in the RPT consists of the instruction address, the address of the operand generated at the last access, and two state bits for the encoding of a finite state machine to record the access patterns and to decide whether subsequent prefetches should be activated or prevented. The RPT will be accessed ahead of the regular program counter by a lookahead program counter (LA-PC). The LA-PC is incremented and maintained in the same fashion as the PC with the help of a dynamic branch predictor. The LA-PC/RPT combination is used to detect regular data accesses in the RPT and to generate prefetching requests. The prefetched data blocks will be put in the data cache. The supporting unit is not on the critical path. Its presence does not increase the cycle time or data access latency except for an increase in bus traffic. The key to the successful working of this technique is the distance between the program counter and the LA-PC so that the prefetched data arrives just before it is needed. Incorrect branch predictions limit the distance from growing too large.

To increase the time between prefetching the data and its subsequent use, Veidenbaum presents a method in his paper, "Instruction Cache Prefetching Using Multilevel Branch Prediction" (pp 51–70), in High Performance Computing, Lecture Notes in Computer Science, V.1336, 1997. In this method the target of a branch instruction is prefetched using a multilevel branch predictor (capable of predicting the branch actions of more than one branch at a time). The predictor consists of a Branch History Register (BHR), a Predictor Table (PT), and associated control logic. BHR holds the program counter, target addresses, and taken/not taken history of previous K branches plus the current branch. The taken/not taken history is stored as one bit and is shifted left on each branch with current branch information shifting in. A PT entry holds 2K target addresses and 2-bit saturating counters to enable or disable prefetching. When the current instruction is a branch, the program counter is used to select the PT entry. The counter with a maximum value among the 2K counters is identified, and the target address associated with the counter is returned as the prediction. The counter is incremented whenever the prefetched line is used in the cache and decremented if it is replaced without having been used in cache. The PT entry is updated every time K branches are filled in the BHR. This technique relies on the accuracy of the branch predictor and prefetches only the target address. It has been applied only to instruction caches.

Liu and Kaeli have proposed a similar technique for data prefetching, in their paper, "Branch-Directed and Stride-Based Data Cache Prefetching," in the Proceedings of the International Conference on Computer Design (pp 225–229), 1996. In this work, the next missing data address in the target path is stored along with the target address in the Branch Target Buffer. Every time the branch instruction is predicted "taken" the data address is prefetched. The method also uses stride prefetching, wherein each data address has a 2-bit counter to detect stride access patterns. The lookahead distance in this technique is only 1 branch and so the latency that can be covered is less than in the technique proposed in this patent.

There are a number of patents directed to prefetching mechanisms, with each having certain advantages and disadvantages.

For example, several patents describe prefetching data inside a program loop.

U.S. Pat. No. 5,704,053 to Santhanam describes a mechanism where prefetching instructions are added to program loops. The technique uses execution profiles from previous run of the application to determine where to insert prefetching instructions in a loop.

U.S. Pat. No. 5,843,934 to Hsu determines the memory access pattern of a program inside a loop. Prefetches are scheduled evenly over the body of a loop. This avoids clustering of prefetches, especially when a prefetch causes castout or write back due to replacing a cache line that was previously updated. Prefetches are scheduled according to the number of loop iterations and number of prefetches to be performed on each loop iteration.

U.S. Pat. No. 5,919,256 to Widigen et al. describes a mechanism where data is prefetched from an operand cache instead of referencing memory. The data values from the operand cache are then used speculatively to execute instructions. If the data values retrieved from the operand cache equal the actual operand values the speculative executions are allowed to complete. If the values are unequal, then all speculative executions are discarded.

U.S. Pat. No. 5,357,618 to Mirza determines a prefetch length for lines of stride 1, or N or a combination of stride values. Stride registers are used to calculate the program's referencing pattern and special instructions are used to transfer values between the general purpose registers and stride registers. The compiler uses these new instructions to control prefetching within a loop.

More general prefetching techniques include: U.S. Pat. No. 5,896,517 to Wilson, which uses a background memory move (BMM) mechanism to improve the performance of a program. The BMM mechanism performs background memory move operations, between different levels of the memory hierarchy, in parallel with normal processor operations.

U.S. Pat. No. 5,838,945 to Emberson describes a prefetching mechanism where lines of variable sizes are fetched into the cache. A special instruction is used to indicate the length of the cache line that is prefetched, the cache set location to preload the prefetched data, and prefetch type (instruction or data).

U.S. Pat. No. 5,918,246 to Goodnow et al. describes a prefetch method that uses the compiler generated program map. The program map will then be used to prefetch appropriate instructions and data information into the cache. The program map contains the address location of branches and branch targets, and data locations used by the program.

U.S. Pat. No. 5,778,435 to Berenbaum et al. describes a history based prefetching mechanism where cache miss addresses are saved in a buffer. The buffer is indexed by an instruction address that was issued N cycles previously. The buffer value is then used as a prefetch address in an attempt to avoid cache misses.

U.S. Pat. No. 5,732,242 to Mowry describes a mechanism where prefetching instructions contain 'hint' bits. The hint bits indicate which prefetch operation is to be performed, i.e. the prefetch is exclusive or read only, and into which cache set the line is loaded (least recently-used or most-recently-used).

U.S. Pat. No. 5,305,389 to Palmer describes a prefetching mechanism that stores the access pattern of a program in a pattern memory. Prefetch candidates are obtained by comparing a current set of objects (accesses) to the objects saved in the pattern memory. Pattern matches need not demonstrate a complete match to the objects saved in the pattern memory to generate a prefetch candidate. Prefetches are attempted for the remaining objects of each matching pattern.

U.S. Pat. No. 5,774,685 by Dubey uses a prefetch instruction that encodes the branch path, determined by the compiler, between the prefetching instruction and the instruction that uses the data, where the branch path represents the actions (taken or not-taken) of the intervening branches. Each prefetched line is tagged with the speculative branch path information contained in the prefetch instruction. Special hardware exists to compare tagged information of a prefetched line to the actual action of the branches executed by the processor. Whenever the tagged information differs from the actual branch actions the prefetched line is discarded earlier, whereas prefetched lines that have tags that equal the actual branch actions are retained longer in the cache.

Similarly, U.S. Pat. No. 5,742,804 to Yeh et al. describes a mechanism that only prefetches instructions. Branch prediction instructions are inserted into a program ahead of an upcoming branch. Each branch prediction instruction serves as a prefetching instruction and contains a guess field predicting the direction of the upcoming branch (taken or not-taken), a prefetch address, number of bytes to prefetch and a trace vector indicating the branch path leading to the upcoming branch. The trace vector is used to cancel issued prefetches by comparing the action of the upcoming branches to the actions predicted by the trace vector. No mechanism exists to prefetch data.

In addition, U.S. Pat. No. 6,055,621 to Puzak, describes a method that conditionally executes prefetch instructions. The mechanism uses a history table that records whether a previously executed prefetch instructions fetched information that was actually used by the processor. The table is called the Touch-History-Table. Information contained in the table is used to execute only those prefetch instructions that fetched useful data and discard (not execute) prefetch instructions that fetched unused data.

SUMMARY OF THE INVENTION

It is an objective of the present invention to describe a way to use the branch history to prefetch instruction and data into the cache sufficiently ahead of time to cover latency. In this invention, we keep track of the control flow path following a branch instruction and also the cache miss(es) that occur along this path. If the same branch instruction repeats in the program's execution, we compare the predicted path with the path last associated with each miss address associated with that branch. When paths match, we prefetch the data (if not present already). The usefulness of the prefetch is determined by using saturating counters and the prefetch can be turned off if it is found to be useless.

It is another objective of this invention to increase the time between issuing a prefetch and the subsequent use of that data. To achieve this, the branch instruction associated with a miss address can be changed dynamically after observing the "timeliness" of the prefetch. Both instruction and data can be prefetched using this mechanism.

BRIEF DESCRIPTION OF THE DRAWINGS

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION

Figure 1:
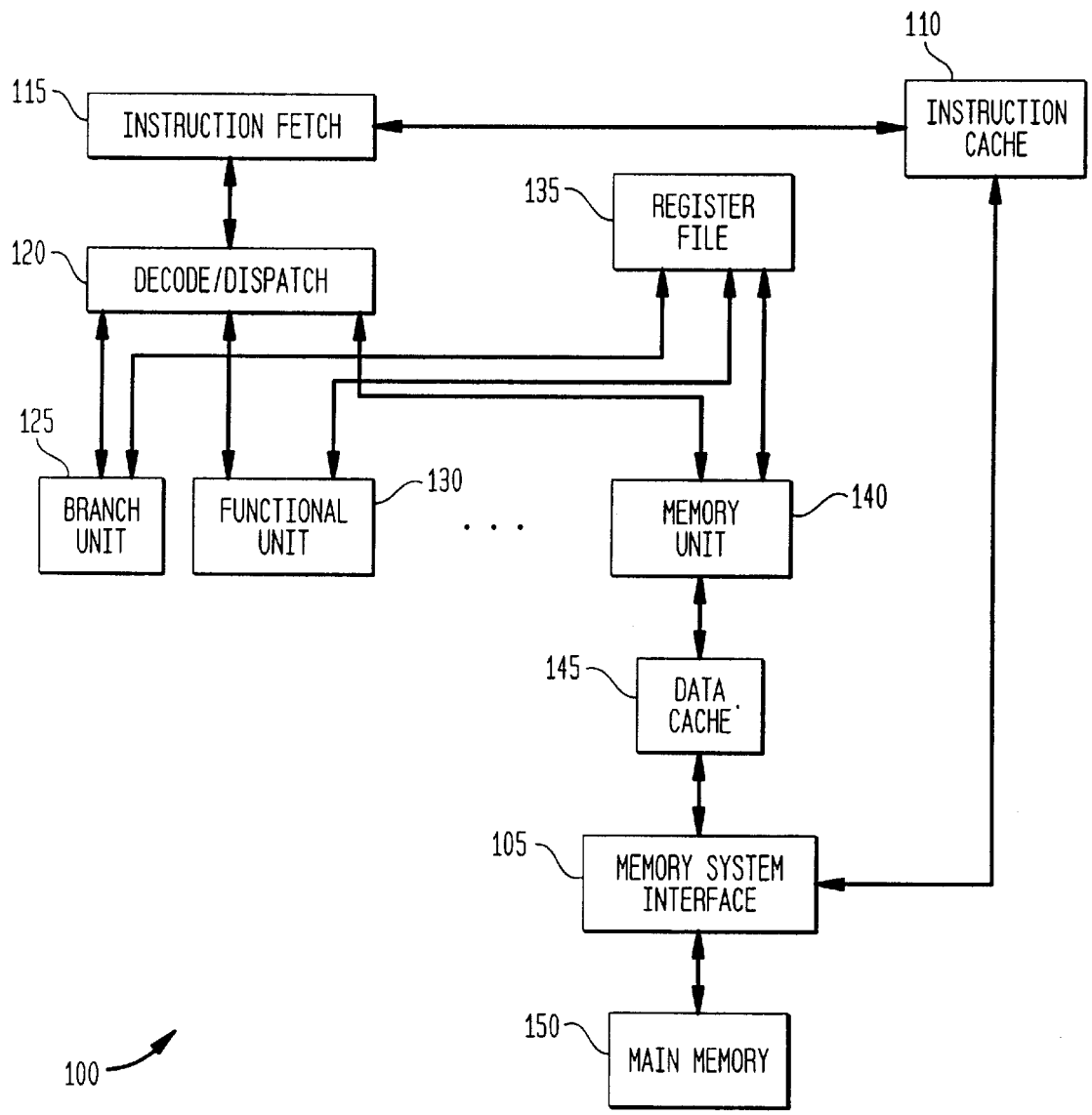
FIG. 1 is a block diagram of a data processing system according to the prior art.
Figure 2:
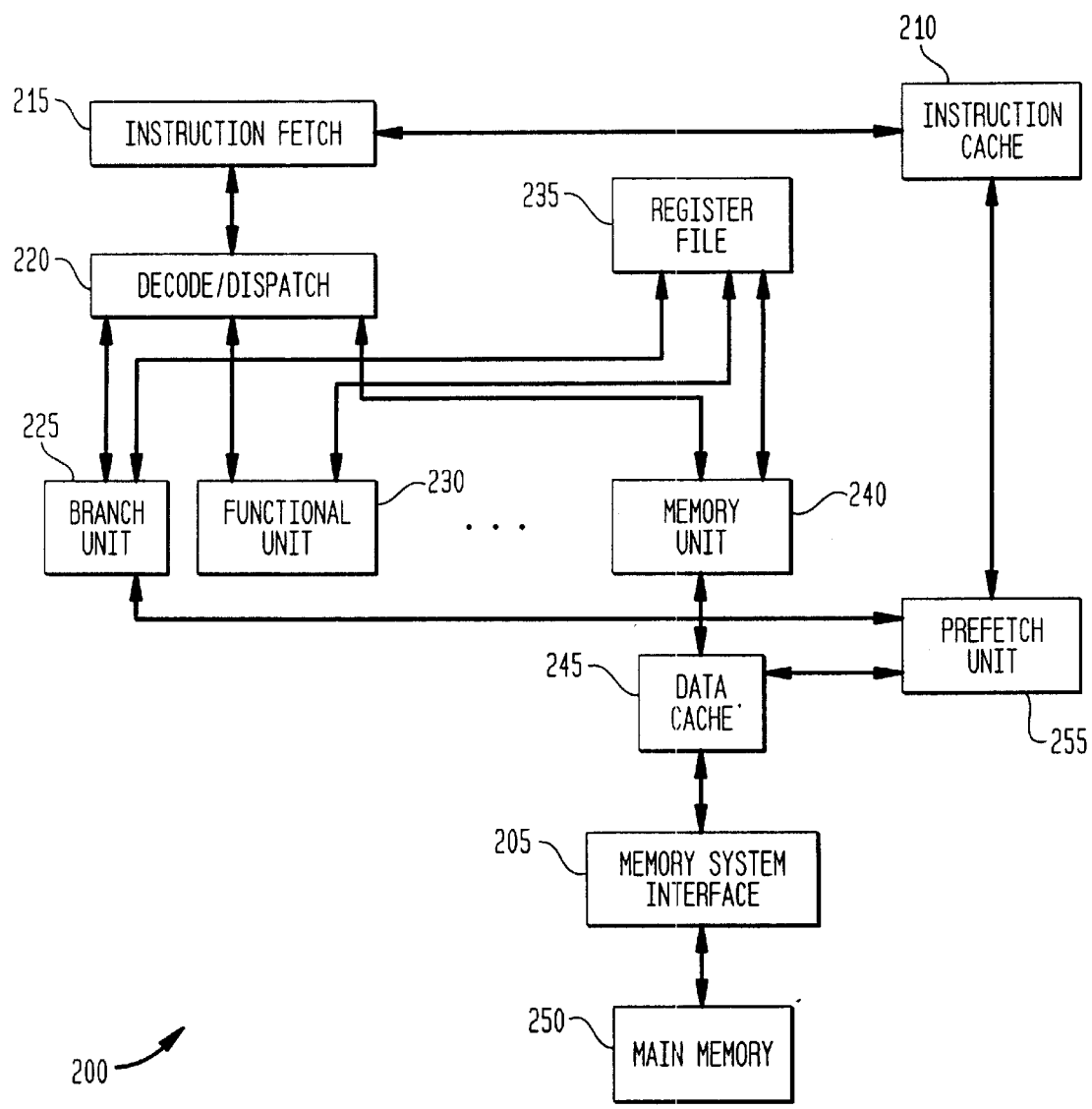
FIG. 2 is a block diagram of a data processing system according to an illustrative embodiment of the present invention.

A general description of the operation of the prefetching mechanism is now set forth and a more detailed description follows. FIG. 2 is a block diagram of a data processing system 200 according to a preferred embodiment of the present invention. Although data processing system 200 has some similarity with data processing system 100, it differs in some key aspects.

In 200 a prefetch unit 255 has been added according to the method and apparatus of the present invention. The prefetch unit 255 communicates with the branch unit 225, data cache 245 and instruction cache 210. Functionally, the prefetch unit 255 is responsible for maintaining and executing prefetch requests in a program. Specifically, the prefetch unit maintains a prefetch "trigger" of a prefetch request. This corresponds to the program counter value associated with a branch instruction. In addition, the prefetch unit maintains the memory address of instructions/data to be prefetched.

In summary, the prefetch unit 255 is accessed (i) when the branch unit 225 executes a program branch, (ii) when a load or store instruction (executed by memory unit 240) causes a cache miss, (iii) when a load or store instruction (executed by memory unit 240) causes a cache hit to a prefetched line, or (iv) when a prefetched line is replaced from the cache without being used. The prefetch unit is described in more detail after the following explanation of the method of operation of an illustrative embodiment of the present invention.

Figure 3:
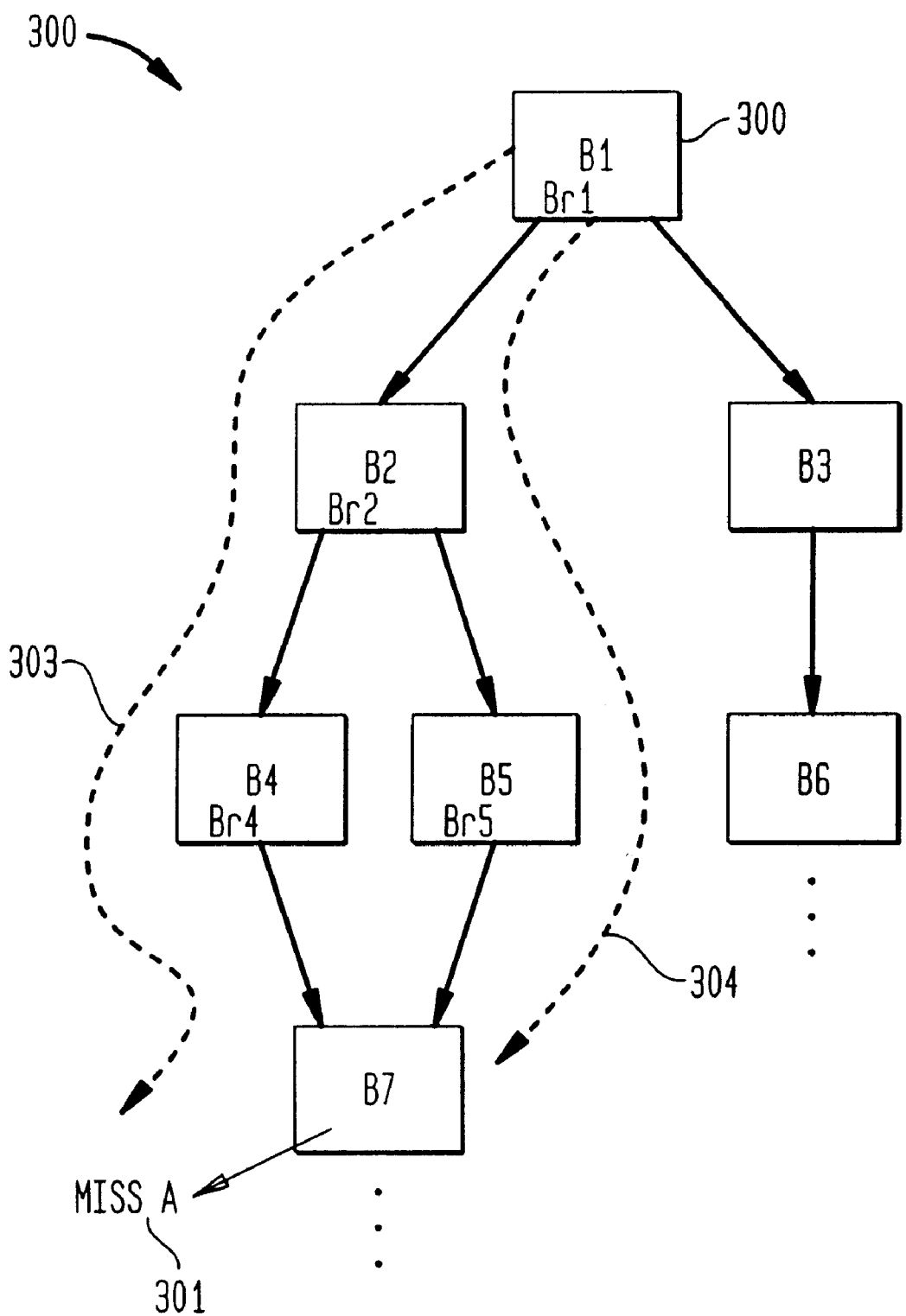
FIG. 3 is an example of a program control flow graph.

We begin by describing our patent application through a control flow graph of a program shown in FIG. 3. For the purpose of this example, we define a basic block as a segment of a program from a branch target up to a branch instruction. There are 7 basic blocks B1–B7 in FIG. 3. The branch instructions at the end of basic blocks B1, B2, and B4 are named Br1, Br2, and Br4 respectively. There is a miss to a datum A (301) in basic block B7. The earliest opportunity to prefetch the memory block containing the datum A is after the outcome of the branch Br1 is known. The not-taken path for each branch is shown as the left edge of a tree fork and the taken path is the right edge. If Br1 is not-taken (i.e., control flows to the basic block B2), the datum A is definitely required. However, if Br1 is taken (i.e., control flows to the basic block B3), prefetching the block containing datum A is not useful.

It is the subject of this invention to keep track of the fact that if the control flow path is B1-B2-B4 (303) or B1-B2-B5 (304), prefetching the block containing datum A is useful, i.e., an association is maintained between A, the branch Br1, and its control flow paths. As the execution flow of a program is repetitive and the branch actions are also repetitive, we can exploit this information when basic block B1 recurs in the program's execution flow. Our prefetching mechanism uses the branch predictor to predict the probable control flow path out of B1 and compares the prediction with the control flow path followed when B1 was last associated with the missing datum A. If the predicted path is either 303 or 304, we issue a prefetch request for the line containing the datum A if it is not already present in the cache. Therefore, the branch instruction B1, serves as a prefetch trigger for the missing datum A.

Figure 4A:
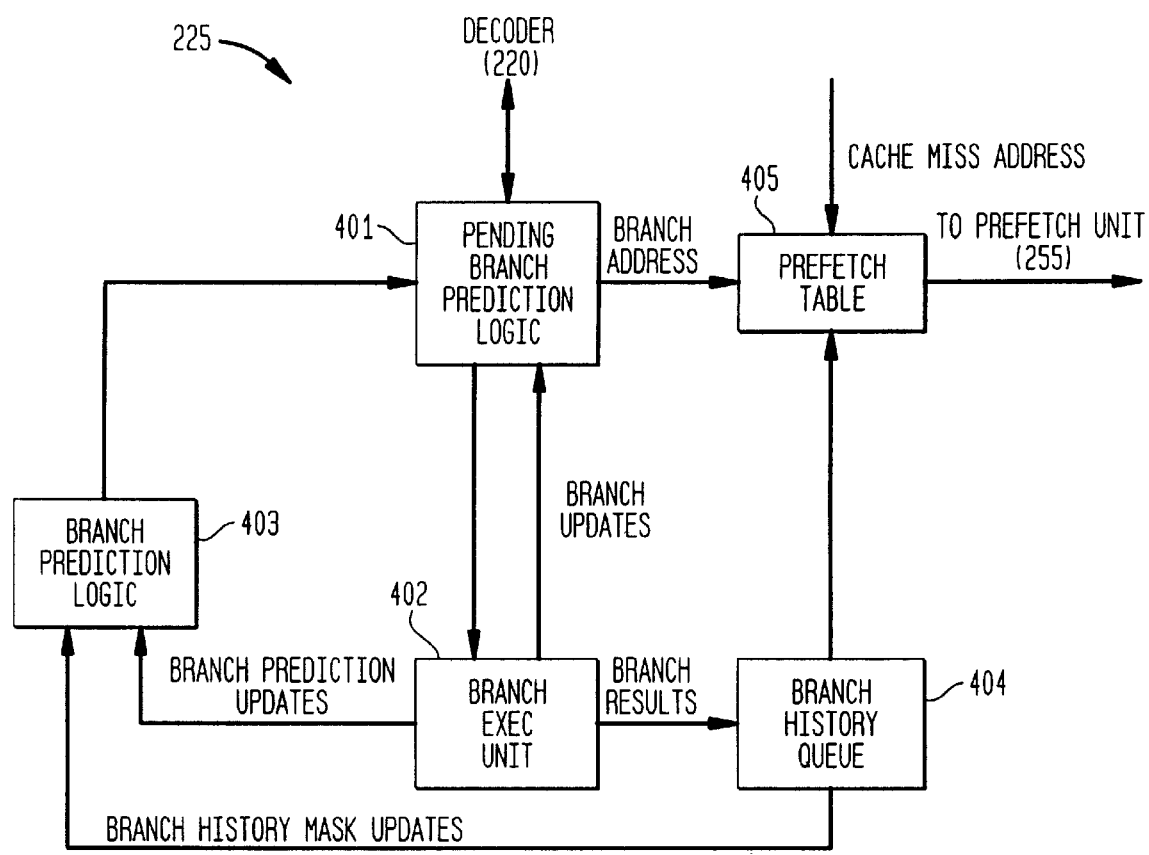
FIG. 4(A) is a functional block diagram of the Branch Unit of FIG. 2 according to the present invention.

FIG. 4A shows the major elements of a branch unit (225) that is necessary to support this prefetching mechanism. It is well known in the art that branches can be predicted with a high degree of accuracy. Using modern branch prediction algorithms, it is common for branch prediction mechanisms to achieve a prediction accuracy of 90% or higher. This observed predictability of branches represents the underlying principle that allows the branch prediction mechanism to record and predict useful prefetches. We now describe in detail the sub-units of the branch unit (225).

Branch Prediction Logic [BPL] (403)

The Branch Prediction Logic [BPL] (403) records branch action information (either taken or not-taken) for previously executed branches. It also guides the instruction fetching mechanism through taken and not-taken branch sequences and receives updates from the branch execution unit (402) and branch history queue (404). Typically the branch prediction logic and instruction fetching logic work hand in hand with branch prediction running ahead of instruction fetching by predicting upcoming branches. The instruction fetching mechanism will use the branch prediction information to fetch sequential instructions if a branch is predicted as not-taken or jump to a new instruction fetch address if a branch is predicted as being taken. When working properly the branch prediction mechanism can detect (predict) taken branches early enough in time so that the instruction fetching mechanism can fetch the branch target before any stalls occur in the pipeline. The branch prediction mechanism functions similarly to a branch history table (BHT) described in U.S. Pat. No. 4,679,141 but contains additional information for each entry in the BPL (both taken and not-taken branches). The additional information describes the predicted branch action for the next N successive branches previously encountered by the processor. This information will be available from the branch history queue (404) and will be sent to the pending branch prediction logic (401). In the pending branch prediction logic, it will be compared against the branch mask contained in the prefetch table (405). The operations of these mechanisms will be described below.

Figure 4B:
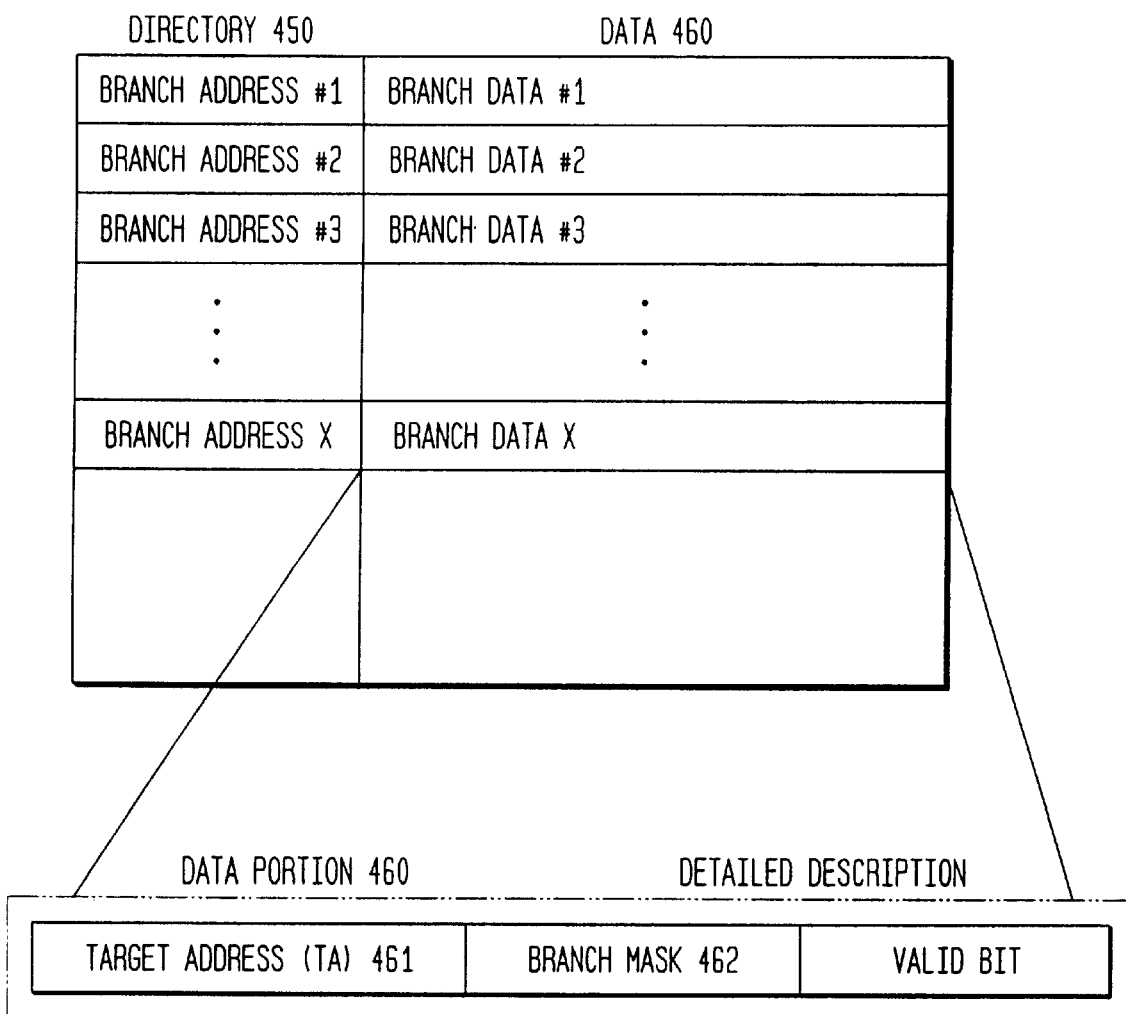
FIG. 4(B) illustrates the contents of a table entry stored in the Branch Prediction Logic of FIG. 4(A).

As mentioned above, the BPL records branch information in a Branch Table (BT) which is similar to the branch information contained in a branch history table. FIG. 4B gives a more detailed description of the branch table (BT) in the Branch Prediction Logic. The BT is arranged as an array of entries, where each entry consists of a directory portion (450) and a data portion (460). The directory portion of each entry identifies the address of a branch that was previously executed by the processor and the corresponding data portion identifies the target address (TA) of the branch (461), a branch mask (462), and valid bit (463) to indicate that the information is valid. Note, all branches (taken and not-taken) executed by the processor will have entries in the array. The branch mask (462) is N bits wide where the first bit identifies the action (either taken or not-taken) of the branch identified by the corresponding directory entry and the remaining N−1 bits of the branch mask identify the action of N−1 branches encountered by the processor subsequent to this branch. The formation of the branch mask will be described more fully below.

The operation of the BT directory/array is very much like a cache except that block entries in the array are not blocks of instructions, but rather contain information about taken and not-taken branches. Consider the entry for a branch at address X. The BT directory/array is accessed with an instruction fetch address and the access address is compared with all the addresses in the directory. If a match occurs (the instruction fetch block contains the branch at address X) then the corresponding target address, branch mask, along with the matching branch address are sent to the pending branch prediction logic (401). If there is no match (a 'miss'), no information is sent to the pending branch prediction logic.

Branch History Queue (404)

Figure 5:
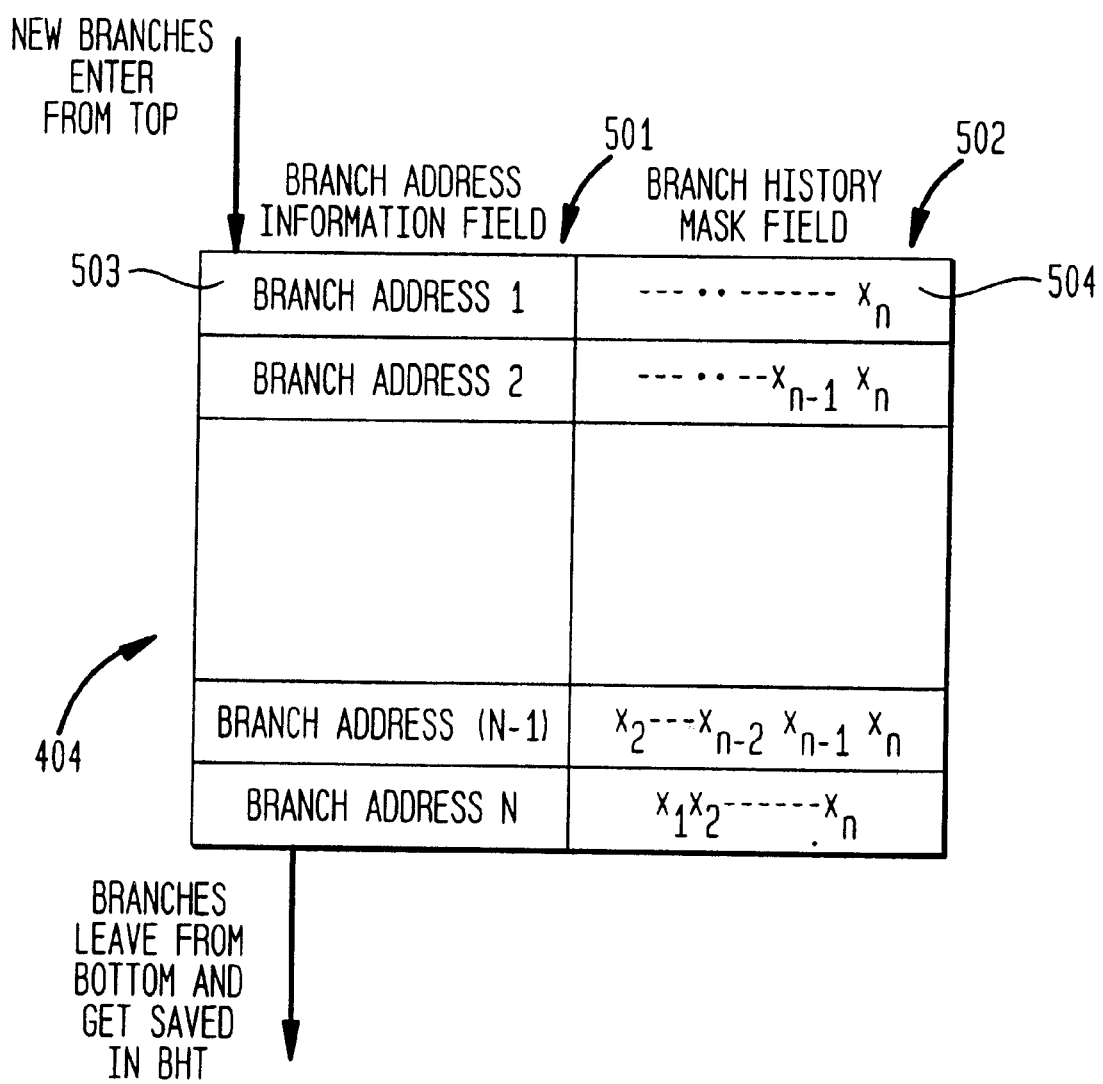
FIG. 5 is a functional block diagram of the Branch History Queue of FIG. 4 according to the present invention.

For each branch executed by the processor, the Branch History Queue (BHQ) (404) temporarily records taken/not-taken actions of branches executed subsequent to this branch. The function of the BHQ is to form the branch history mask for each entry in the BPL (403). This mask is then compared to the branch mask of the Prefetch Table (405). FIG. 5 shows the essential features of the Branch History Queue. The figure shows the BHQ arranged as an array of entries consisting of a branch address information field (501) and a branch history mask field (502). Contained in the branch address information field are N branch address entries (503). Associated with each branch address entry is a branch history mask (504) consisting of N bits. Each of the N bits represents the action (either taken or not-taken) of the branch and the N−1 subsequent branches encountered by the processor and correspond to the N sub-fields in the prefetch table's branch mask.

The branch history queue can be implemented as a first-in-first-out (FIFO) queue where each new branch encountered by the processor is placed in the first position of the BHQ. When a branch is executed by the processor, four actions occur in parallel. First, all existing branch address entries and their corresponding branch mask information are pushed down one position in the queue. This frees up the first position of the queue for the new branch address entry. Second, all branch history masks are shifted left 1 bit, making room for the branch action of the new branch that just entered the queue. Third, the address of the branch is placed in branch_address_1 of the BHQ and the branch history mask field is cleared. Fourth, the new branch action is then added as the rightmost bit of all branch history masks in the branch history queue. Constructing the branch history mask in this manner aligns each branch action field to match the order of the N sub-fields of the branch mask found in the prefetch table.

For example, FIG. 5 shows only the rightmost bit of the first entry of the BHQ defined. Here, $X_n$ represents the action of the branch. In fact, the nth bit of each branch history mask represents the action of the branch found in the first position of the branch history queue. The second entry of the queue, branch_address_2, has only the two rightmost bits filled in. Here $X_{n-1}$ represents the action of the branch identified in its branch address field and $X_n$ represents the action of the branch executed next.

Note, this is the branch in the first position of the BHQ. Finally, the last entry on the BHQ shows a branch history mask that is N bits wide and completely filled in. The bits are numbered $X_1, X_2, \ldots X_{n-2}, X_{n-1}, X_n$. Here, $X_1$ describes the action of the branch identified by the branch_address field. Its value can either be a 1 representing the branch was taken or a 0 meaning the branch was not-taken. Bit $X_2$ describes the action of the branch executed after the branch identified in the branch_address field and so on with the action of the last three branches executed labeled $X_{n-2}, X_{n-1}, X_n$. These identify the action of the branches in the third, second, and first positions of the BHQ, respectively.

For each new branch that enters the BHQ, a branch must leave from the bottom of the BHQ (ignoring startup conditions). When a branch leaves the BHQ its branch mask is complete. The branch mask is then saved in the BPL for future reference. This process involves searching the BPL for the address of the branch leaving the BHQ. If a match is found, then the branch mask replaces the one in the matching BPL entry. If a match is not found, then a new entry is made in the BPL for this branch address and the branch mask is saved along with it. This branch mask represents the program path of N successive branches (beginning with the corresponding branch) executed by the processor.

Prefetch Table (405)

For each cache miss seen in the program, an entry is made in the prefetch table by encoding an execution path starting from a branch instruction and ending at the instruction causing the miss. The missing address is associated with this execution path. In the preferred embodiment, the number of branch instructions in the execution path can vary. The outcome (taken/not taken) of each branch in the execution path is encoded as 1-bit (for example, 0 for not taken and 1 for taken) and the outcomes of all the branches in the execution path are combined to form the encoded mask field of the entry in the prefetch table.

Figure 6:
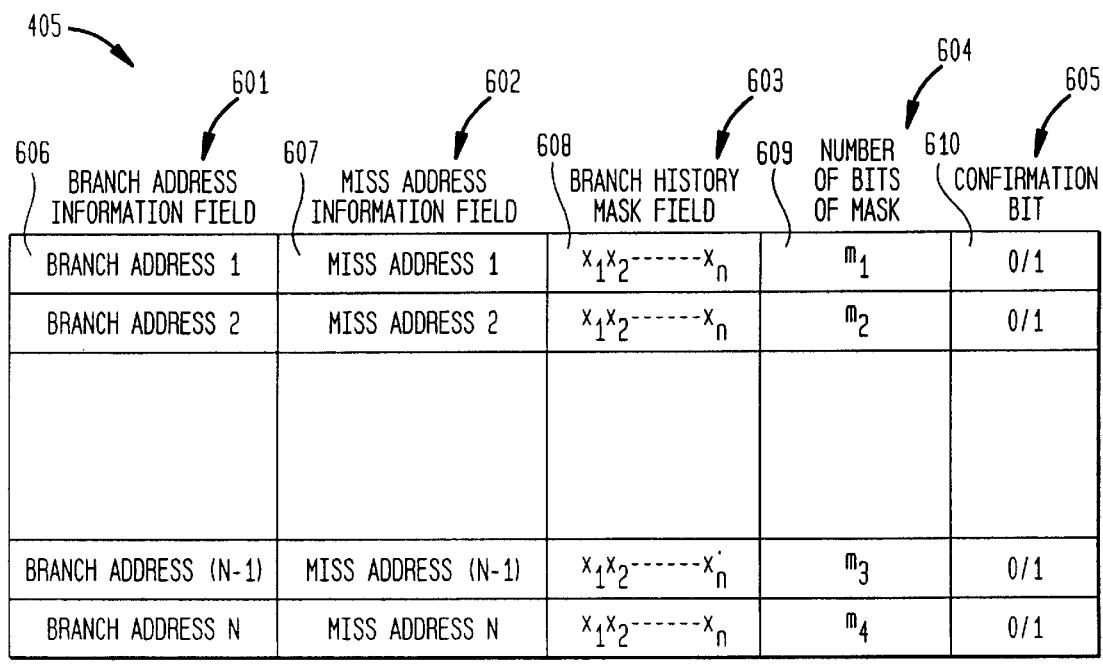
FIG. 6 is a functional block diagram of the Prefetch Table of FIG. 4 according to the present invention.

FIG. 6 gives a more detailed description of the PT. The PT is preferably arranged as a cache that is searched using the branch address information field 601. The other fields making up a PT entry include miss address information field (602), branch history mask field (603), the number of bits of mask field (604) and a confirmation field (605). The branch address information field contains individual branch address entries 606, where a branch address entry identifies the address of a branch whose direction was predicted by the branch prediction mechanism. Note that each address saved in the branch address field can be abbreviated or truncated. It is possible to save only a subset of the bits that make up the full branch address in each PT entry. Associated with each branch address entry in the PT are one or more miss address entries 607, each having a branch history mask 608 entry, "number of bits of mask" (609), and a confirmation bit 610. The miss address information field identifies the instruction/data cache address of a prior cache miss correlated with the branch address field. The branch history mask contains N bits, where each bit represents the predicted action (either taken or not-taken) of successive N branches (beginning with the branch corresponding to the branch address field 606 of the entry) that are encountered by the processor. For example, the first bit of the branch history mask 608 represents the predicted action of branch identified in the corresponding branch address field 606 of the entry. The second bit represents the predicted action of the branch that will be executed by the processor following the branch found in its corresponding branch address field and so on. Since the number of valid bits of mask can be between 1 and N, the "number of bits of mask" (609) field keeps track of the count of the total valid bits of mask in field 608. The confirmation bit associated with each miss address field indicates whether the prefetch of the miss address was useful or the prefetch was replaced before being used. A zero (0) represents that the prefetch was not useful the last time and one (1) implies that it was useful. The confirmation bit is initially set to 0 to inhibit prefetching. Note that initializing the confirmation bit to 0 is an implementation decision and does not affect the operation of the system described herein. Although the prefetch table may include a plurality of miss addresses and masks associated with a branch address entry 605, the configuration of FIG. 6 is chosen for simplicity and to present an explicit design.

On a L1 cache miss, a new entry is added to the PT by encoding an execution path starting from a branch instruction and associating the missing address with this execution path. This enables prefetching the missing address in the future using the branch instruction as the prefetch trigger. Recall that for each branch (Br) executed by the processor, the BHQ (404) temporarily records taken/not-taken actions of branches executed subsequent to Br and thus forms the branch history mask encoding the execution path starting from Br. If the missing address has not been prefetched so far in the execution of the program, then the branch address and the mask from the top-most entry of the BHQ is associated with the missing address and is added as a new entry in the prefetch table. If there has been a prefetch of the missing address in the past, the method and apparatus to determine the "position" in the BHQ from where to read the branch address and the mask to be associated with the missing address is explained in detail in FIG. 15. If the PT is full, one of the entries of the PT is evicted using any of the known replacement policies (least recently used, random, pseudo-lru).

Branch Execution Unit (402)

All the program branches are sent to the decode logic unit 701. The pending branch prediction logic (401) supplies the branch execution unit (402) with the branch prediction information. After the branch instruction is executed, the branch execution unit sends the taken/not-taken results of the branch instruction to the BHQ (404). In addition, the branch execution unit supplies the branch outcome to the branch prediction mechanism for comparison with the predicted outcome.

Pending Branch Prediction Logic (401)

Figure 7:
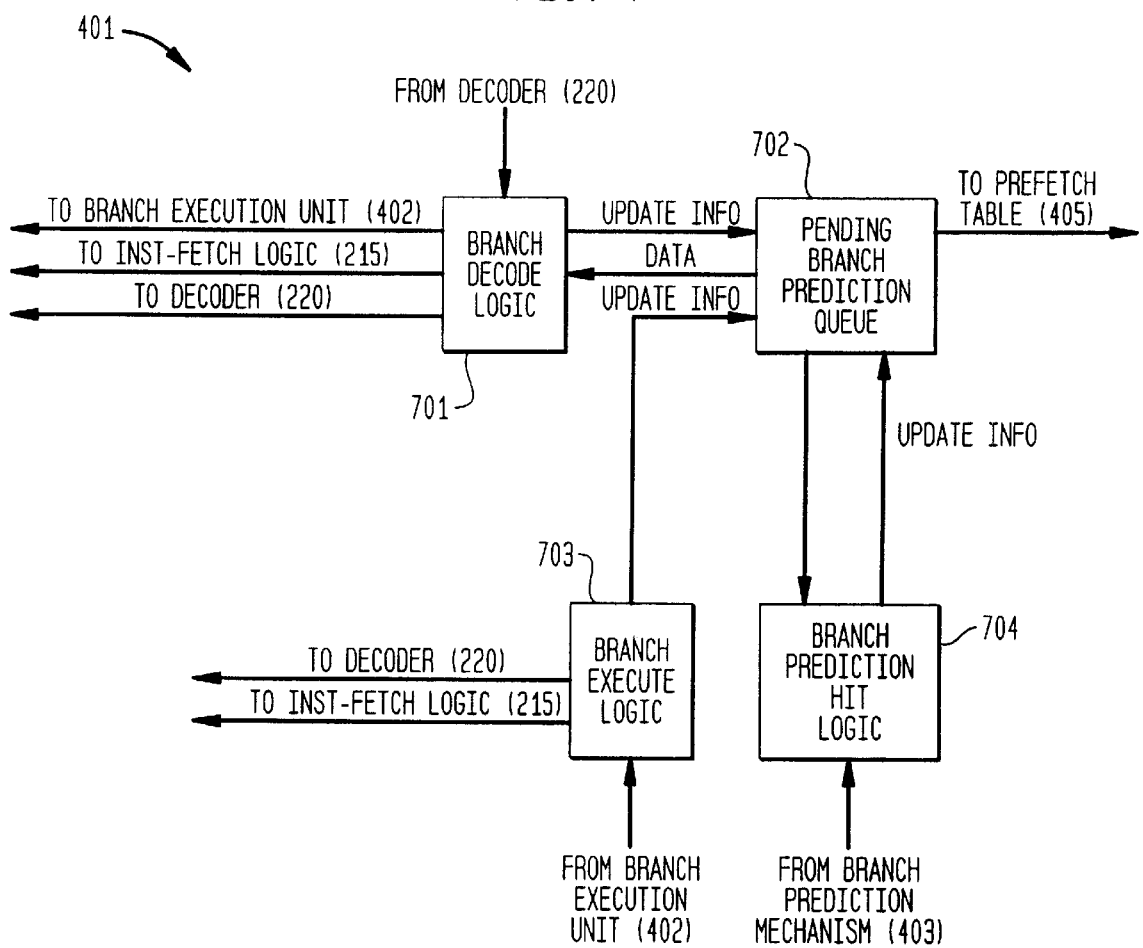
FIG. 7 is a functional block diagram of the Pending Branch Prediction Logic of FIG. 4 according to the present invention.

The pending branch prediction logic (401) is described in detail in FIG. 7. It contains four sub units: the branch decode logic 701, the pending branch prediction queue (PBPQ) 702, the branch execute logic 703, and the branch prediction hit logic 704.

The PBPQ holds prediction information describing the action of N branches for each branch detected by the branch prediction mechanism 403 (in FIG. 4). This information will be used or modified by the other three sub units in the pending branch prediction logic. If the decoder sends instruction decode information for a branch instruction, control flow proceeds to the branch decode logic unit 701. The branch decode logic supplies the branch execution unit (402) with the branch prediction information and resets the decoder (220) with address sequencing information after a decoded branch. The branch execute logic 703 checks the branch prediction information against the actual execution results of the branch. When prediction errors are detected, the PBPQ is purged, and the instruction fetching unit (215) and decoder (220) are restarted. The branch prediction hit logic 704 saves branch prediction information in the PBPQ. This information is used by the other sub-units in the branch unit (225).

It is noted that many of the functions described in the pending branch prediction logic would actually be integrated into the decoder, branch prediction mechanism, or execution units of a processor. Typically, cycle time constraints would require certain parts of this logic to be placed within these units. However, they are described below separately for simplicity of exposition.

Pending Branch Prediction Queue (PBPO) (702)

Figure 8:
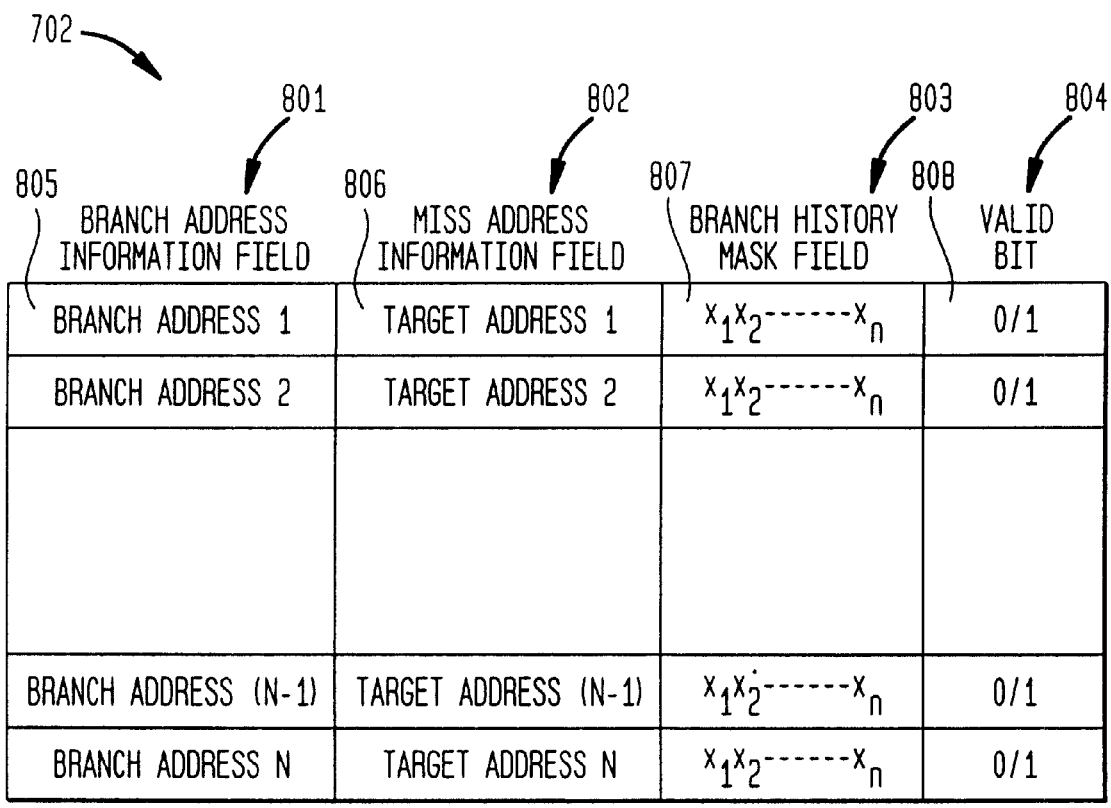
FIG. 8 is a functional block diagram of the Pending Branch Prediction Queue of FIG. 7 according to the present invention.

The PBPQ is described in detail in FIG. 8. When a branch is detected by the branch prediction mechanism, an entry consisting of the branch address, predicted target address, and branch history mask is saved in the PBPQ. FIG. 8 gives a more detailed description of the PBPQ. The PBPQ is arranged as an array of entries having a branch address information field 801, a target address information field 802, a branch history mask field 803, and a valid bit field 804. The branch address information field contains individual branch address entries 805, where a branch address entry identifies the address of a branch whose direction was predicted by the branch prediction mechanism. It is noted that each address saved in the branch address field can be abbreviated or truncated. It is possible to save only a subset of the bits that make up the full branch address in each PBPQ entry. Associated with each branch address entry in the PBPQ are a branch target entry 806, a branch history mask 807 entry, and valid bit 808. The branch target field identifies the predicted target address of the corresponding branch identified by the branch address field. The branch history mask contains N bits, where each bit represents the predicted action (either taken or not-taken) of successive N branches (starting from the branch corresponding to the branch address field 801 of the PBPQ entry) that are encountered by the processor. For example, the first bit of the branch history mask represents the predicted action of branch identified in the corresponding branch address field. The second bit represents the predicted action of the branch that will be executed by the processor following the branch found in its corresponding branch address field and so on. The valid bit associated with each branch address field indicates if the branch address entry is valid. A zero (0) represents not-valid and a one (1) represents valid. These N bits correspond to the N bits in the branch mask of the entries of the PT.

It is convenient to think of the PBPQ as a queue with the first entry (the top most) as being the oldest entry. New entries are added to the first available free entry starting from the top of the queue and searching to the end. During processing entries are removed from the top of the queue and all valid sub-entries are pushed up one position. It will be seen that this guarantees that there will always be a free position when needed.

Branch Prediction Hit Logic (704)

Figure 9:
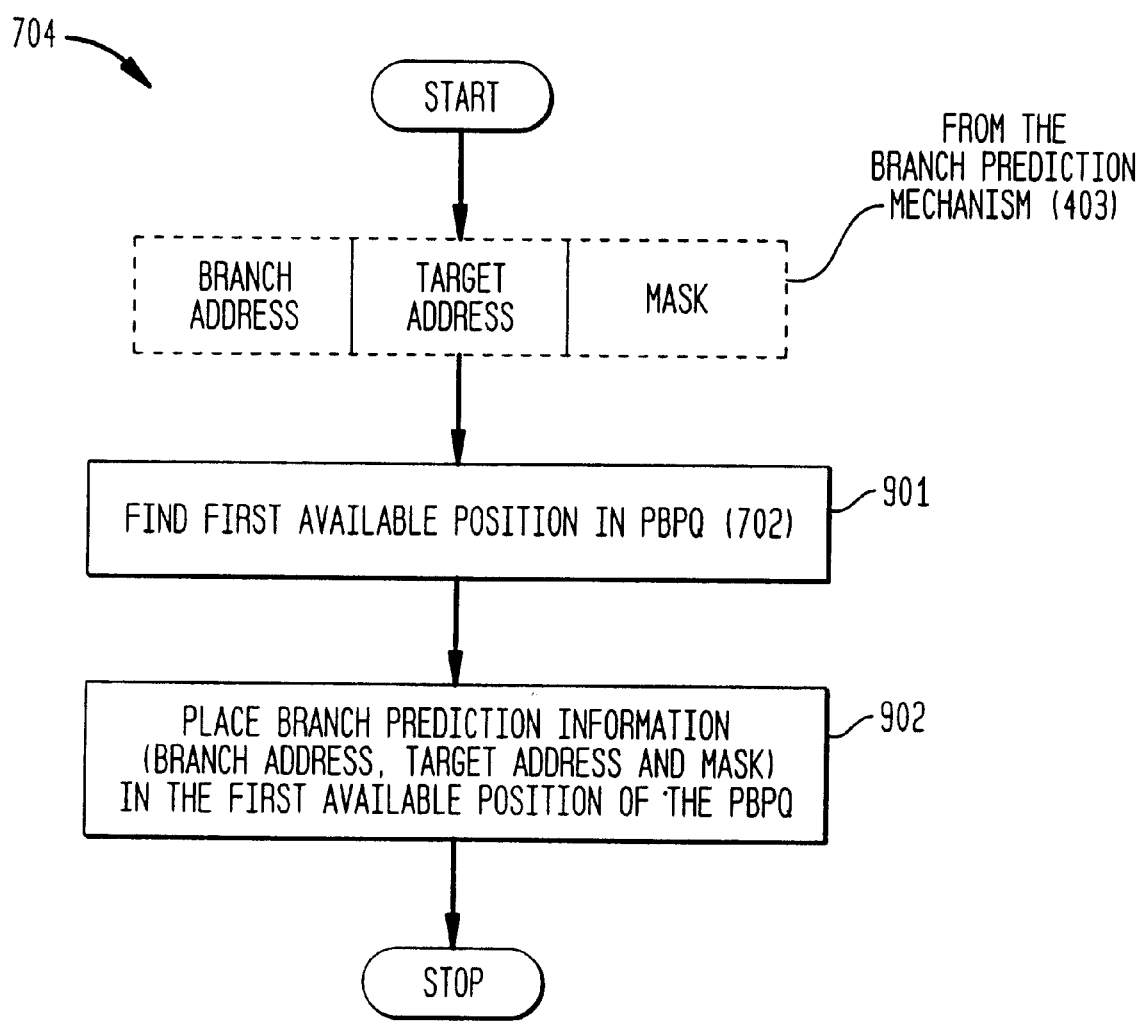
FIG. 9 is a flowchart diagram explaining the operation of the Branch Prediction Hit Logic of FIG. 7 according to the present invention.

FIG. 9 shows the details of the operation of the branch prediction hit logic. The branch prediction entry consisting of the branch address, target address and the mask is supplied by the branch prediction logic (403). In step 901, the PBPQ is searched for the first available position. In step 902, the PBPQ is updated using the branch prediction information.

Branch Decode Logic (701)

Figure 10:
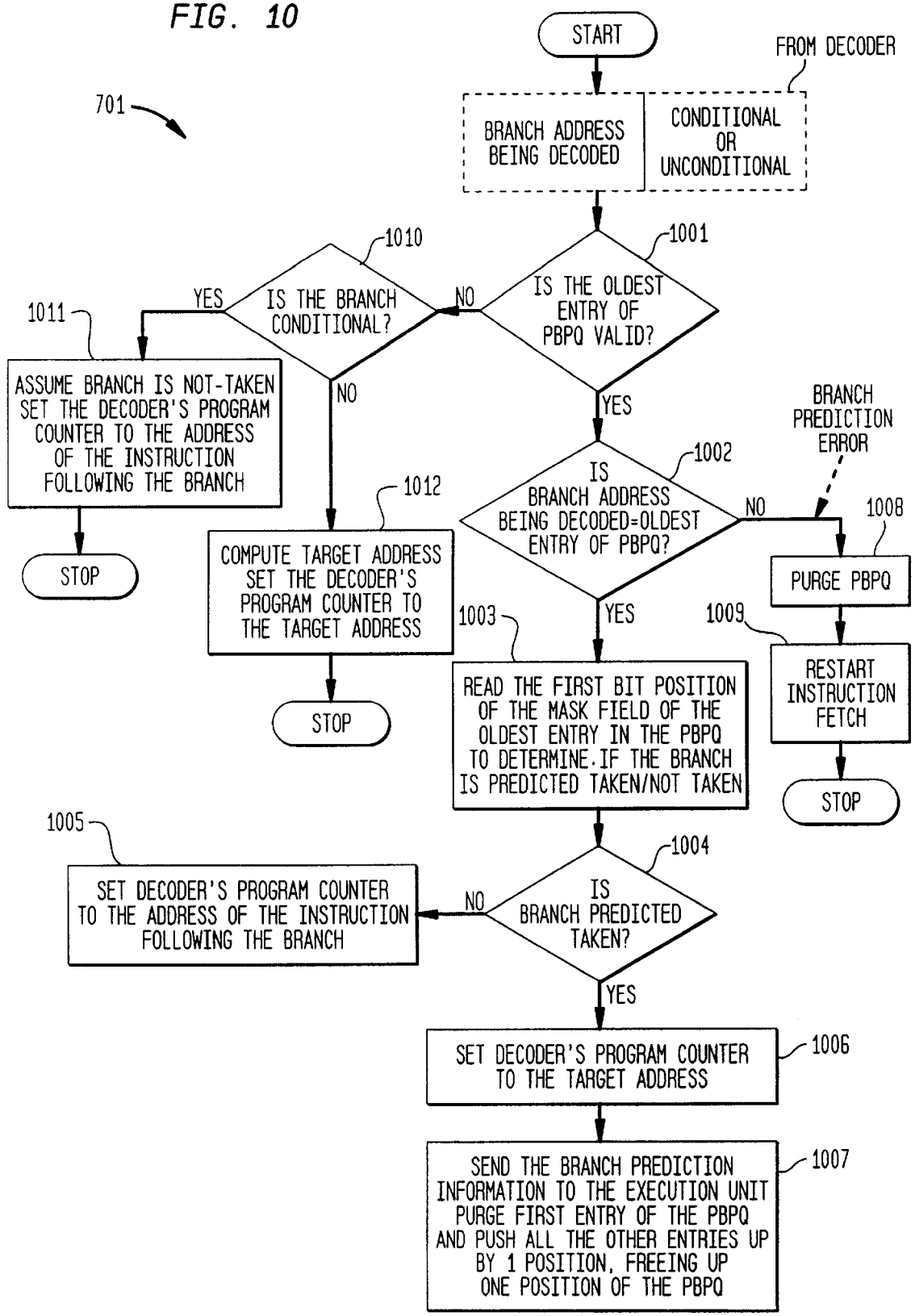
FIG. 10 is a flowchart diagram explaining the operation of the Branch Decode Logic of FIG. 7 according to the present invention.

FIG. 10 shows in detail the operations of the branch decode logic. Each time a branch is decoded, the oldest entry of the PBPQ (702) is checked. Recall that, the first entry of the PBPQ is the oldest entry. In step 1001, it is determined if the first entry is valid. If the entry is valid, in step 1002, the address of the branch being decoded is compared to the branch address field of the oldest entry of the PBPQ. In step 1003, if the branch address matches the oldest entry in the PBPQ, then the predicted program path is accurately following the actual path of the program and the first branch prediction bit of the branch history mask field (of the oldest entry of PBPQ) is examined, in step 1004, to determine if the prediction of the branch is taken or not-taken. If the branch is predicted taken, in step 1005, the decoder's program counter is set to the predicted target address of the branch instruction. Returning to step 1004, if the branch is predicted not taken, the decoder's program counter is set to the address following the branch instruction, as shown in step 1006.

In step 1007, the predicted branch outcome (taken/not taken) and the predicted target address is sent to the branch execution unit (402). Finally, the first entry of the PBPQ is removed and all other entries are pushed up one position, making a position available in PBPQ.

Returning to step 1002, if the branch being decoded does not match the address of the predicted branch found in the oldest entry of the PBPQ, a branch prediction error has occurred. The program is not following the path predicted by the branch prediction mechanism. When this occurs, the PBPQ is purged in step 1008. In step 1009, the instruction fetch logic (215) is restarted by purging the instruction buffer and starting anew at the address following the branch just decoded.

Returning to step 1001, if the oldest entry of the PBPQ is invalid, the branch prediction mechanism has not yet predicted a branch. Typically, this event occurs when the processor is executing a program branch for the first time or after existing branch information has aged out of the BPL (403). When this occurs, the BPL (403) is void of any branch information and is unable to supply information about any upcoming branches. In this case, a static prediction is made. For example, in step 1010, the condition code of the branch is examined. If the branch is conditional, in step 1011, it is assumed that the branch is not-taken and the decoder continues to decode instruction following the branch. If the branch is unconditional, in step 1102, the target address is computed and the program counter of the decoder is set with the target address.

Branch Execute Logic (703)

Figure 11:
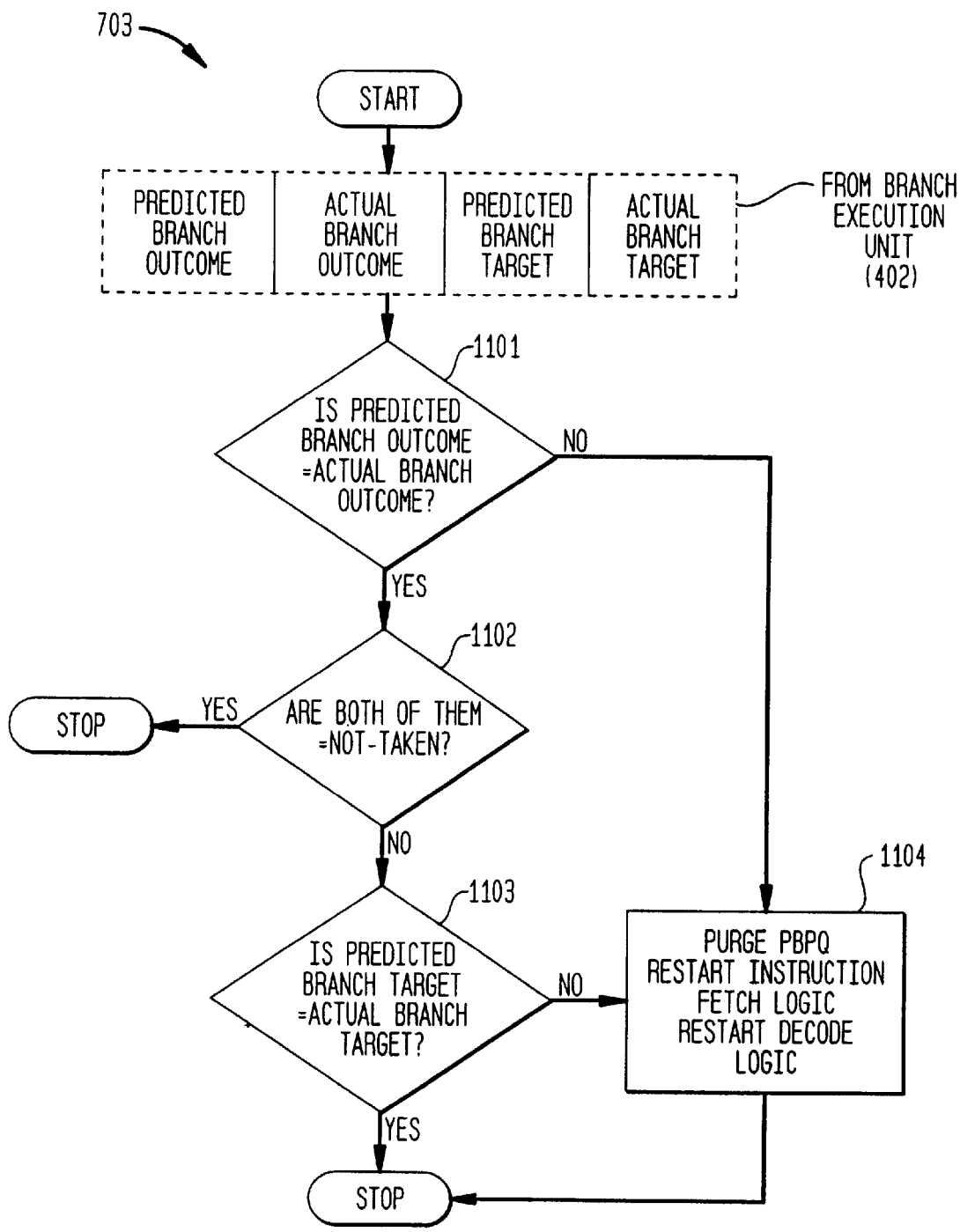
FIG. 11 is a flowchart diagram explaining the operation of the Branch Execute Logic of FIG. 7 according to the present invention.

The operation of the branch execute logic is presented in FIG. 11. The branch execute logic receives the following information from the branch execution unit (402):
(a) predicted branch outcome (taken/not-taken);
(b) actual branch outcome;
(c) predicted target address; and
(d) actual target address.

In step 1101, the predicted branch outcome and the actual outcome are compared. If the predicted outcome and the actual outcome are equal, in step 1102, they are compared to determine if both are not-taken. If both of them are not-taken, then no action is required. If the predicted outcome and the actual outcome are both taken, then the predicted and the actual target addresses are compared in step 1103. If the addresses match no action is required. When the addresses do not match the pipeline is restarted by purging the PBPQ, restarting the instruction fetch, and restarting the decode logic.

Returning to step 1101, if the predicted outcome and actual outcome are different, the prediction was wrong and we go directly to step 1104.

Figure 12:
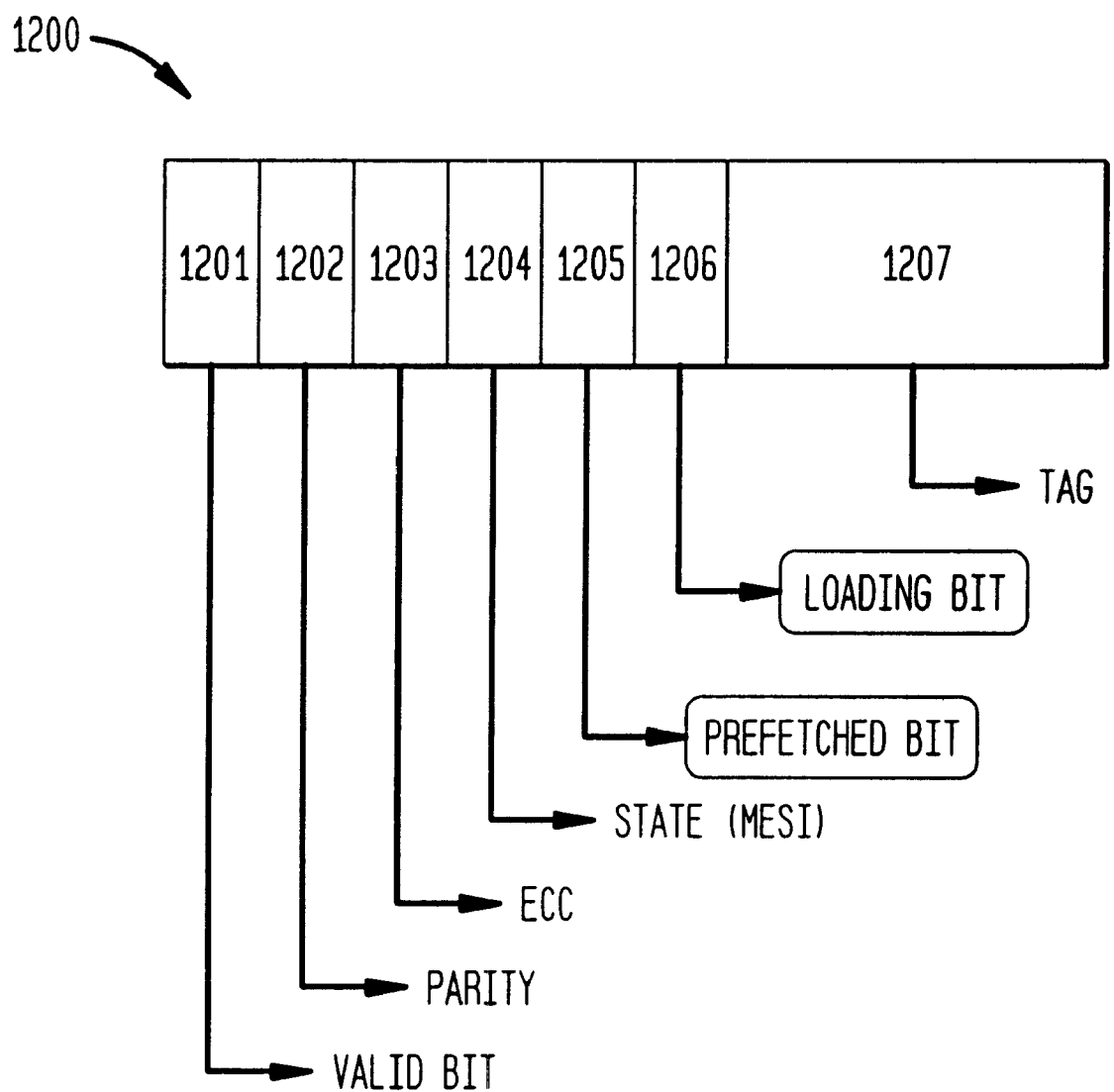
FIG. 12 illustrates the contents of a L1 cache directory entry according to the present invention.
Figure 13:
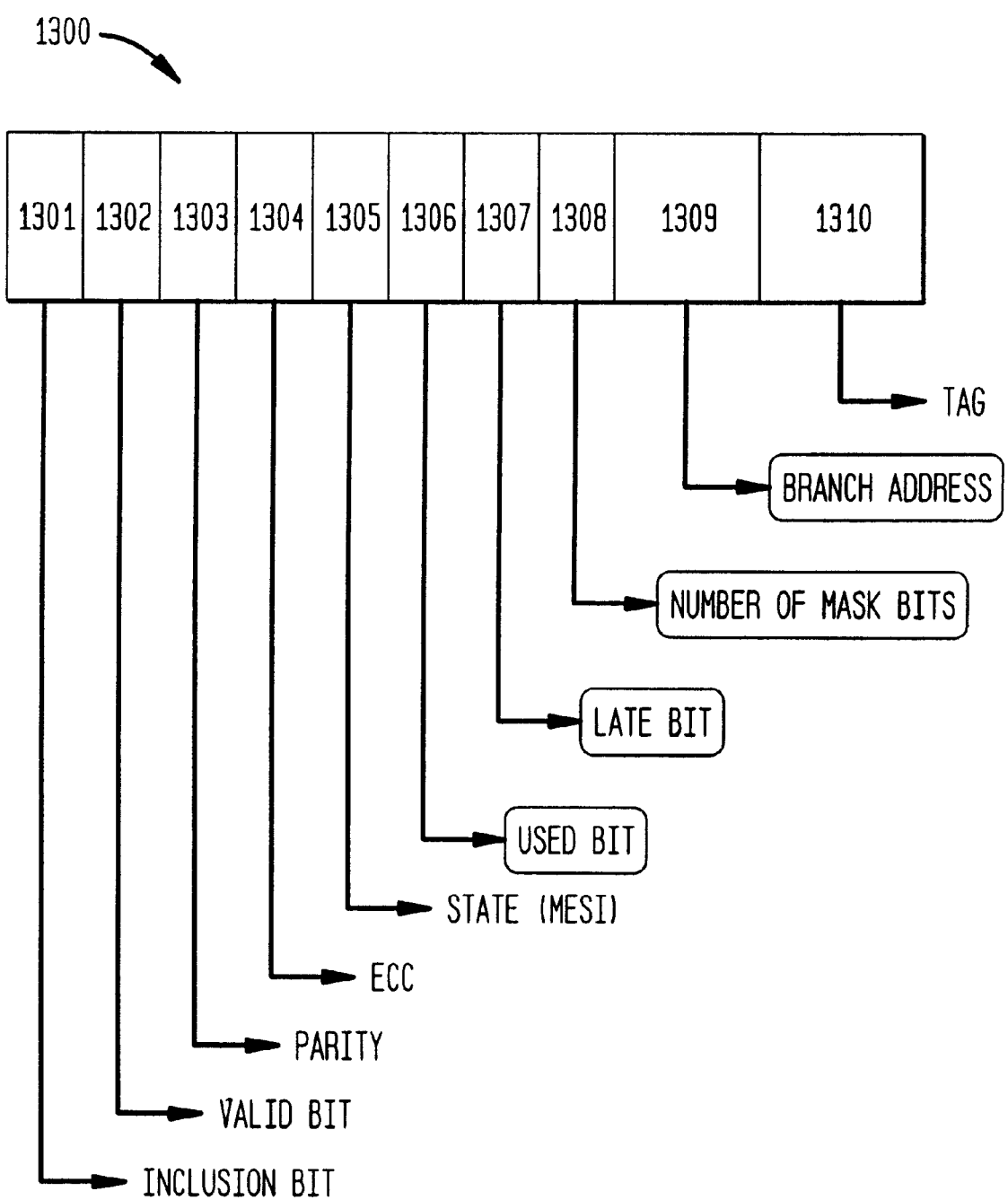
FIG. 13 illustrates the contents of a L2 cache directory entry according to the present invention.

According to another illustrative embodiment of the present invention, FIG. 12 and FIG. 13 show the cache directory entries for our L1 and L2 cache system respectively. The L1 cache directory entry 1200 has valid bit 1201, parity bit 1202, Error Correction Code (ECC) 1203, State (modified, exclusive, shared, invalid) 1204, tag 1207 fields similar to the caches in prior art 100. The additional fields of the present invention are:

Prefetched bit (1205): A 1-bit field that is set to 1, if the line is prefetched and has not been referenced since it was prefetched. It is set to 0 once the line is referenced. It is noted that normal cache misses set the prefetched bit to 0.

Loading bit (1206): A 1-bit field that is set to 1, while a cache miss (line) is being transferred from memory (or L2) to the L1 cache. It is set to 0 once the line transfer is complete and the line has fully arrived into the L1 cache.

The L2 cache directory entry 1300 has inclusion 1301, valid 1302, parity 1303, Error Correction Code (ECC) 1304, State (modified, exclusive, shared, invalid) 1305, tag 1310 fields similar to the caches in prior art 100. The additional fields of the present invention are:

Used bit (1306): The used bit field indicates whether the line was referenced while it was in the L1 after it was prefetched. If the line was referenced in the L1 after it was prefetched, then the prefetch of this line was useful. If the line was not referenced after it was prefetched into the L1, the prefetch of this line was not useful. This 1-bit field is set to 1, if the line was referenced in the L1 when it was last prefetched. It is set to 0 if the prefetched line was not referenced when it was in the L1.

Late bit (1307) The late bit field indicates if the line, when it was prefetched into the L1 cache, was referenced before it arrived completely into the L1 cache. This indicates that the prefetch was "late". If it is a "late" prefetch, it means that the prefetch was not issued early enough in time to hide the latency and so the timeliness of future prefetches of this line should be suitably adjusted to make it arrive early in time into the L1. This 1-bit field is set to 1, if the prefetched line in the L1 was referenced before it has completely arrived. It is set to 0 if the prefetched line was referenced after it has fully arrived into the L1. In the preferred embodiment, the late bit is set to 1 as follows: On the initial reference to a prefetched line in the L1 (indicated by the prefetched bit (1205) being 1), the loading bit (1206) in the L1 directory is read out. If the loading bit is set to 1, it means that the line being referenced has not arrived completely into the L1. In this case, the late bit of the corresponding line in L2 directory is set to 1.

Number of mask bits (1308): This field keeps track of the number of mask bits used when the corresponding line was last prefetched into the L1 cache. This field indicates the number of bits of mask used to compare the branch mask field in PT with the branch mask field of the BPL (403) when determining if a prefetch should be issued. For subsequent prefetches to this line, the value of this field will be incremented, decremented, or remain the same depending on the timeliness of the last prefetch.

Branch address (1309): This fields keeps track of the branch instruction which served as a prefetch trigger for this line when it was last prefetched into the L1 cache.

We can now fully describe the actions of this invention. It is convenient to consider this mechanism as 4 independent but synchronized processes, each triggered by a specific event. Table 1 lists the trigger events, the processes, and the figures that describe the actions in the processes.

TABLE 1

Trigger Events and Associated Processes

| Trigger Event | Process | Figure |
| --- | --- | --- |
| Branch Instruction Decode | Prefetch initiation | 14 |
| L1 Cache Miss | Make a New Entry in PT and update L2 | 15 |
| Prefetched cache line hit | Prefetch migration and confirmation | 16 |
| Prefetched cache line replacement | Future Prefetch inhibition | 17 |

Each process is described more fully below.

Event—Branch Instruction Decode

Figure 14:
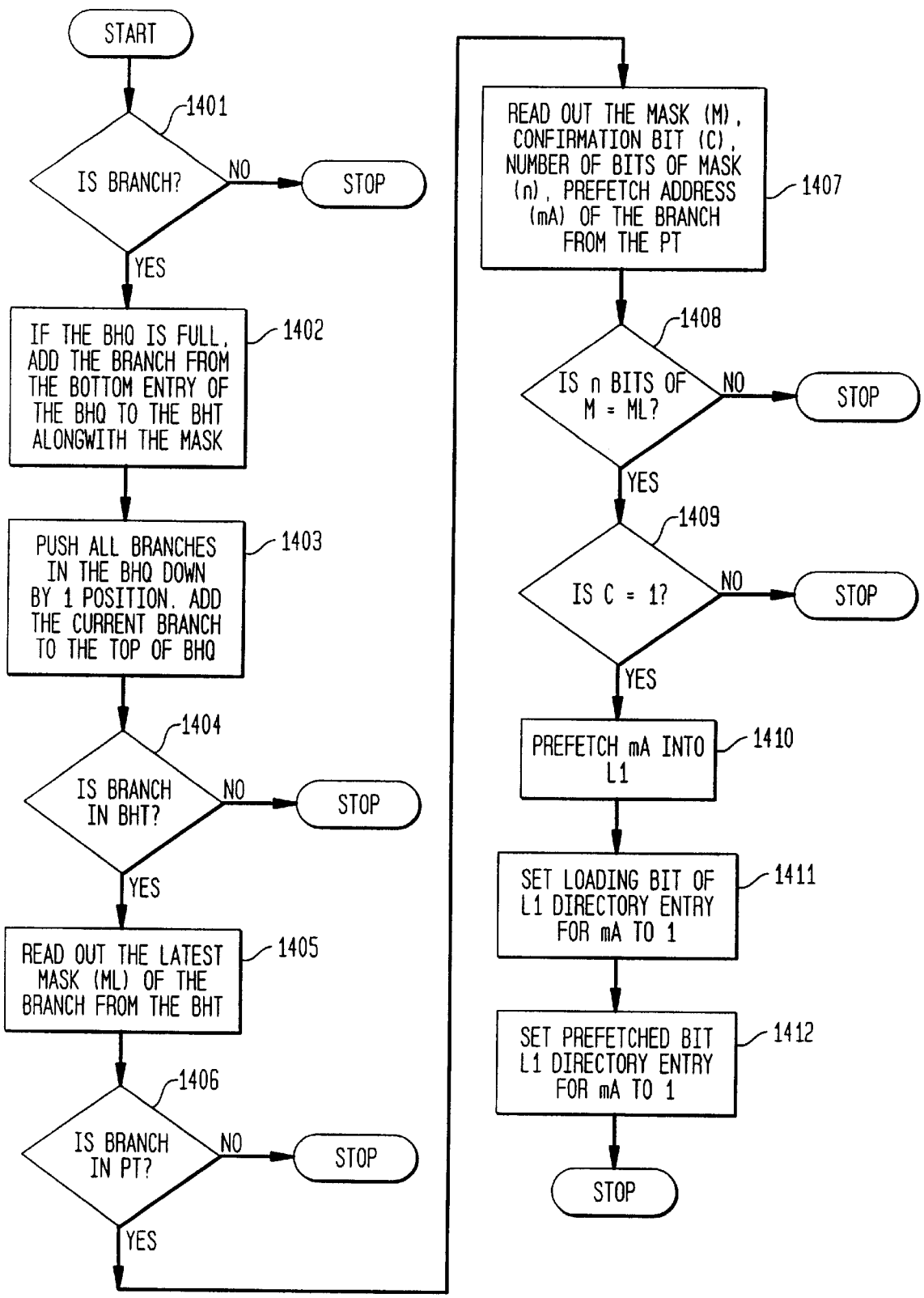
FIG. 14 is a flowchart diagram explaining the prefetch algorithm according to an illustrative embodiment of the present invention.

During the decode process all the branch instructions are also sent to the pending branch prediction mechanism. Recall, from FIG. 4 that all branch instructions are sent to the branch decode logic (701) in the decode cycle. The branch instruction address is communicated to the prefetch unit (255) by the branch unit (225) to determine if a prefetch should be initiated. The method of prefetching data into the cache according to an illustrative embodiment of the present invention is shown in FIG. 14. At step 1401, it is determined if the instruction being decoded is a branch. If it is not a branch, no prefetch is initiated. If the instruction is a branch, in step 1402, the bottom entry of the BHQ containing a branch address and the corresponding mask is removed and added to the BPL (403), thereby freeing one entry of the BHQ. In step 1403, all the branches in the BHQ are pushed down by 1 position and the current branch being decoded is added to the top of the BHQ. Recall that for each new branch that enters the BHQ, a branch must leave from the bottom of the BHQ (ignoring startup conditions). When a branch leaves the BHQ its branch mask is complete. The branch mask is then saved in the BPL (403) for future reference. In step 1404, it is determined if an entry corresponding to the current branch instruction address is present in the BPL (403). If it is not present, no prefetch is initiated.

Returning to step 1404, if an entry corresponding to the current branch address is present in the BPL (403), in step 1405, the mask field 462 of the corresponding entry is read out of the BPL (403). For the sake of description, the mask field of this entry is denoted ML. In step 1406, it is determined if an entry is corresponding to the current branch instruction address is present in the PT. If it is not present, no prefetch is initiated. Typically, this occurs when (i) when the branch is being decoded for the first time in the program, (ii) when the branch has aged out of the PT and hence there is no entry for it, or (iii) there was no miss associated with this branch.

Returning to step 1406, if an entry is corresponding to the current branch instruction address is present in the PT, the mask (M), the confirmation bit (C), the number of mask bits used (n), and the prefetch address (mA) of the corresponding entry is read out of the PT in step 1407. In step 1408, the most significant "n" bits of the masks M (from PT) and ML (from BPL) are compared for a match. The branch masks are compared bit by bit where each bit indicates if a future branch is predicted as taken or not-taken. If there is no match, no prefetch is initiated. This implies that the latest control flow of the program associated with the branch (as seen from the mask ML in the BPL) is different from the control flow observed when the branch was associated with the prefetch address (mA) (as seen from the mask M in the PT).

Returning to step 1408, if the masks match, in step 1409, it is determined if the confirmation bit C (from PT) is set to 1. Recall, that if the confirmation bit of the PT entry is set to 1, it means that the last time (mA) was prefetched into the L1, it was used. If the confirmation bit (C) is not set to 1, no prefetch is initiated.

Returning to step 1409, if the confirmation bit (C) is set to 1, in step 1410, a prefetch is initiated using the address mA of the corresponding PT entry (which preferably initiates prefetching for the line containing datum mA, if it is not present in the L1 cache). In step 1411, the loading bit is set to 1 for the L1 directory entry of mA and it remains set to 1 until the line containing datum mA arrives completely into the congruence class of the L1 cache. In step 1412, the prefetched bit is set to 1 for the L1 directory entry of mA to indicate that it is a prefetched line. Recall that the prefetched bit is set to 0 only if this line is referenced while it is in the L1 cache.

It is noted that an alternate method to improve the timeliness of the prefetch involves locating the next prefetch (or the next prefetch trigger) in the PT if the missing address associated with the current prefetch trigger is already present in the cache. This can be achieved as follows: Each entry of the BPL (403) can be augmented to hold the successor branch address. When a branch instruction is decoded, it is determined whether a prefetch can be initiated using the algorithm outlined in FIG. 14. If the datum identified by the prefetch address associated with the branch instruction is already present in the cache, then the successor branch address from the BPL entry of the current branch can be used as the next prefetch trigger and another execution of the algorithm in FIG. 14 can be done to initiate a prefetch using this new trigger. This chaining of prefetch triggers can continue until we find a prefetch trigger whose prefetch address is not already present in the cache and therefore a prefetch can be initiated. This improves the timeliness of a prefetch because we lookahead for a possible future prefetch trigger and issue a prefetch.

Event—L1 Cache Miss

Figure 15:
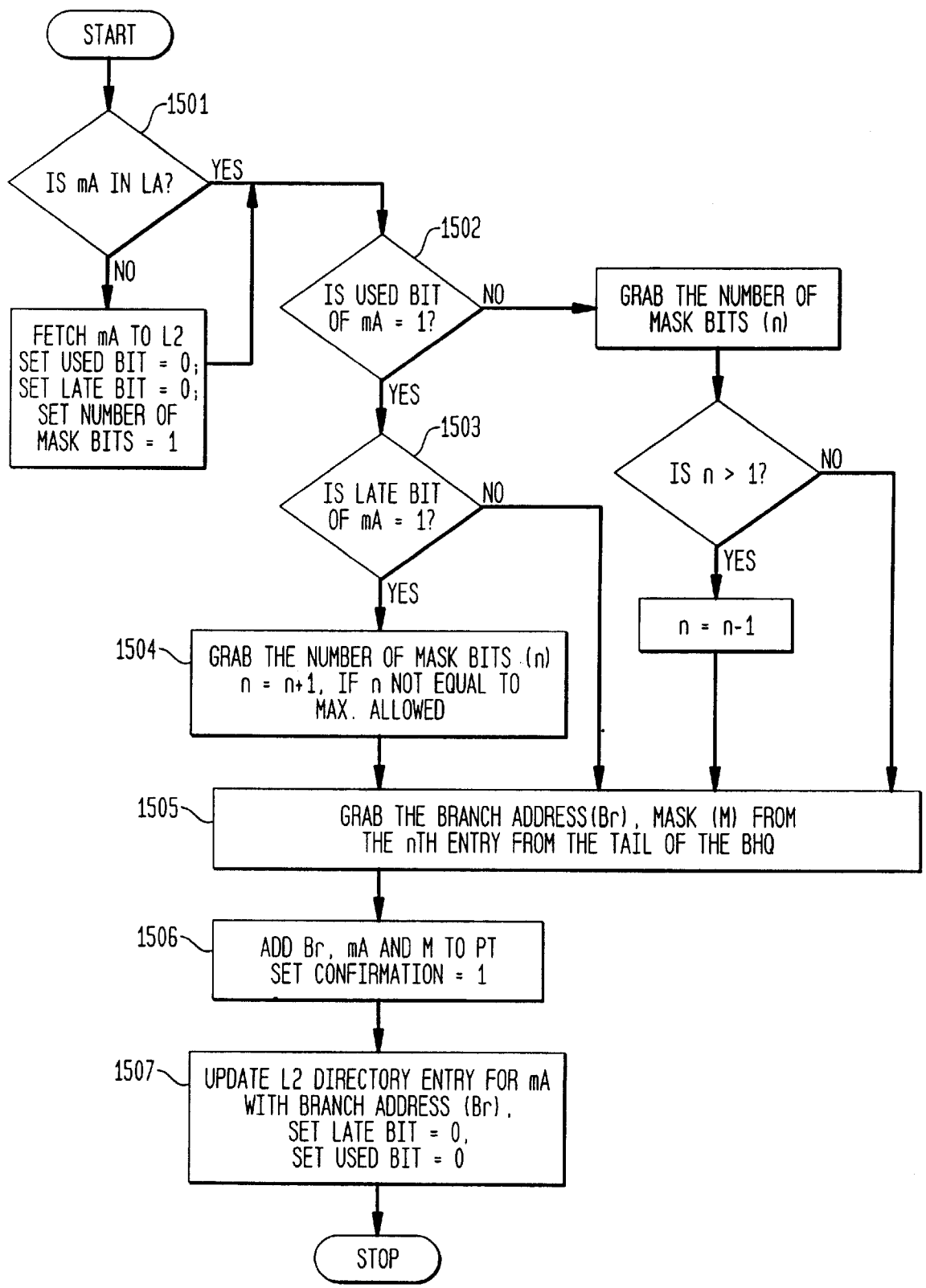
FIG. 15 is a flowchart diagram explaining the actions on a L1 cache miss according to an illustrative embodiment of the present invention.

The behavior of an illustrative embodiment of the present invention in response to a cache miss is shown in FIG. 15. When a L1 cache miss is detected the following two actions are required: (i) adding a new entry in the PT; and (ii) updating the fields of the L2 cache directory entry. We now describe these actions in detail.

In step 1501, it is determined if mA is present in L2. If mA is not present in L2, it is fetched from memory and placed in L2. Since we do not have any information on whether the line containing datum mA was prefetched into the L1 in the past, we set to 0 the used bit and the late bit and set to 1 the field containing the number of mask bits in the L2 directory entry for mA and proceed to step 1502. Returning to step 1501, if mA is present we proceed directly to step 1502. Referring back to FIG. 13, if the used bit (1305) in the L2 directory entry is set to 1, it implies that the line containing datum mA was prefetched in the course of execution of the program and was subsequently referenced (used). In step 1502, if used bit is set to 1, it is determined in step 1503 if the late bit (1306 in FIG. 13) is set to 1 (Recall that if the late bit is set to 1, it means that the last time the line containing datum mA was prefetched into the L1, it was referenced before it arrived completely into the congruence class of the L1). If the late bit is also set to 1, the field containing the number of bits (n) of mask used the last time the line containing mA is prefetched is read out in step 1504.

If the late bit and the used bit are both set to 1, it means that the last time the line containing datum mA was prefetched into the L1 it was used, but it was referenced before it arrived completely into the congruence class of the L1 cache. To increase the time between the prefetch and the use of the prefetched data, we increment by 1 the number of mask bits associated with the line containing mA. This means that if the last prefetch of the line was issued by looking ahead "n" branches, the subsequent prefetch (if required) will be issued by looking ahead at "n+1" branches.

Returning to step 1502, if the used bit in the L2 cache directory entry is set to 0, it implies that either the line containing mA was never prefetched prior to this or it was prefetched and was not used before being replaced. If the field containing the number of bits of mask (n) is 1 it implies that the line was never prefetched prior to this. Otherwise, n>1 and it means that the last time the line was prefetched, it aged out of the L1 without being used. This could be because the line was prefetched earlier than when it was required. Hence we decrement n by 1, so that if the last prefetch to the line was issued by looking ahead at "n" branches, the future prefetches (if any) will be issued by looking ahead at "n−1" branches.

In step 1505, a new entry is added to the prefetch table (405) as described in FIG. 6. The number of bits of mask field (n) of the L2 cache directory entry, provides the "position" in the BHQ from where the branch address and the mask have to be read. Recall that the BHQ is maintained as a FIFO and each new branch that is executed by the program is added to the top of the BHQ by pushing all the entries in the BHQ down by 1 position. Therefore, the nth entry from the top of the BHQ provides the execution path containing "n" branches and the prefetch unit reads the nth entry from the top of the BHQ containing the branch address (Br) and the "n" bit branch mask (M). In step 1506, the branch instruction (Br) and the mask (M) are added to the prefetch table along with the address mA. The confirmation bit (C) for this entry is set to 1, to enable prefetching mA in future. Future prefetches of the line containing mA are triggered using the branch address (Br) and the execution path encoded in the mask (M).

Since a new entry has been added in the PT, the L2 cache directory has to be updated to reflect this. In step 1507, the used bit and the late bit of the L2 cache directory entry are set to 0 to indicate that there is no information (yet) about the usefulness of this new prefetch address that has been added to the PT. In addition, the branch address (Br) that is associated with mA in the PT is also added to the L2 cache directory entry. If the line containing mA is prefetched into the L1 in the future, these fields are used to keep track of the usefulness of such a prefetch.

Event—Prefetched Cache Line Hit

Figure 16:
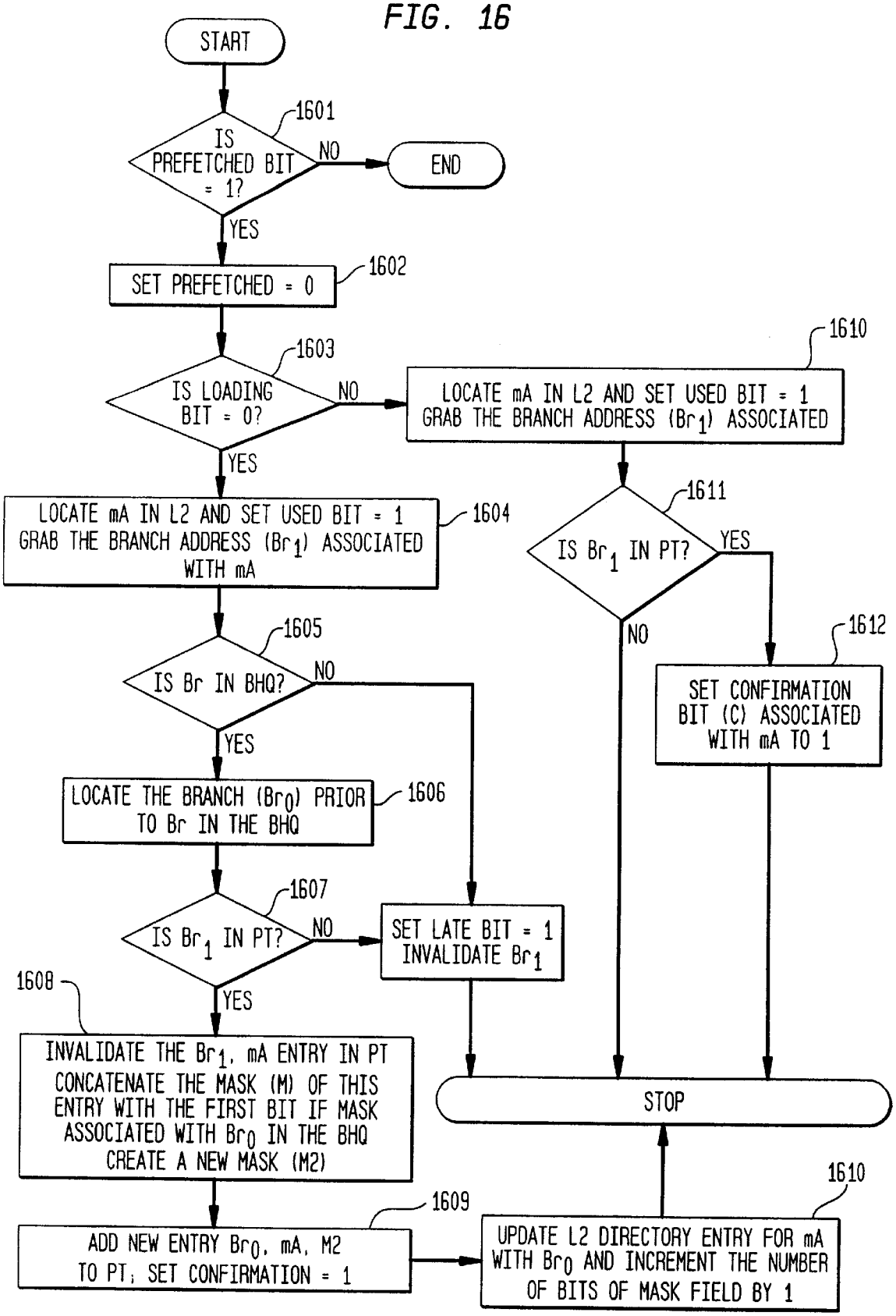
FIG. 16 is a flowchart diagram explaining the actions on a L1 cache hit to a prefetched line according to an illustrative embodiment of the present invention.

The behavior of an illustrative embodiment of the present invention in response to a hit to a prefetched line is shown in FIG. 16. On a hit to a line containing datum mA, the following updates are done to the L1 and L2 cache directory. Referring back to FIG. 12, if the prefetched bit (1205) is set to 1, it implies that the line containing the datum mA is now being referred for the first time after it has been prefetched into the L1 cache. In step 1601, if the prefetched bit is set to 1, it is set to 0 in step 1602. To determine if the line containing the datum mA has arrived completely into the cache or is still in the process of being filled in, the loading bit is checked in step 1603. If the loading bit is set to 1, it implies that the line containing datum mA has not arrived completely. This implies that the there was not sufficient time between the prefetch being issued and the use of the prefetched data. In this case, to enable future prefetches of mA to be initiated earlier, the following updates are done to the L2 directory. If the last prefetch of the line containing mA was issued by looking ahead "n" branches, the future prefetches (if any) should be issued by looking ahead at "n+1" branches. This is accomplished as follows: The L2 is searched for a directory entry containing mA. If found, the corresponding branch address is read from the matching directory entry and communicated to the branch unit in step 1604. (It is noted that the search should always be successful due to the inclusion of the L1 in the L2. ) Let Branch_address_1 denote the branch instruction. Note that this is the address which triggered the prefetch to the line containing the datum mA.

The branch unit searches the BHQ for the Branch_address_1. If a match exists, the branch unit returns the branch that occurred prior to Branch_address_1 in the execution of the program as shown in steps 1605 and 1606. Let Branch_address_0 denote the branch that occurred prior to Branch_address_1. Referring to FIG. 5, we see that if Branch_address_1 is the kth entry from the top of the BHQ, Branch_address_0 will be the (k+1)th entry from the top of the BHQ according to an illustrative embodiment of this invention. Note that if the Branch_address_1 is the bottom-most entry of the BHQ, no migration of the branch address is possible. The branch unit communicates Branch_address_0 and the first bit of the mask associated with Branch_address_0 to the prefetch unit.

The prefetch unit, searches for the Branch_address_1 in the prefetch table in step 1607. If an entry for Branch_address_1 exists in the prefetch table, the mask (M) associated with the address mA in this entry is concatenated with the 1 bit mask (associated with the branch Branch_address_0) communicated by the branch unit to create a new mask (M2) to be associated with the branch address Branch_address_0 as shown in step 1608. Note that the new mask is "n+1" bits long.

Referring to FIG. 6, the prefetch table (405) is updated as follows. The branch (Branch_address_0), the mask (M2), and the number of bits of mask M2 are added to the prefetch table along with the address mA and the entry for branch Branch_address_1 is invalidated as shown in step 1609. The L2 directory entry for mA is updated as follows: The Branch_address_1 is replaced by the branch address Branch_address_0 and the number of bits of mask used is incremented by 1 as shown in step 1610.

Returning to step 1603, if the loading bit is set to 0, the prefetched line containing datum mA has arrived into the L1 cache prior to its use. Hence the used bit in the L2 directory of the line containing mA is set to 1. This is used to indicate that the prefetch was useful. In addition, the branch instruction, Branch_address_1, that triggered this prefetch is read out of the L2 cache directory and is communicated to the prefetch unit in step 1610. In step 1611, the prefetch unit searches the prefetch table for the branch instruction (Branch_address_1). If an entry is found, the confirmation bit (C) associated with the address (mA) is set to 1 in step 1612.

Returning to step 1605, if the branch (Branch_address_1) is not found in the BHQ, the branch that was executed prior to it will also not be present in BHQ. In this case, the branch unit sends a signal to the L2 cache directory to set the late bit (associated with the line containing datum mA) to 1 and invalidates the branch address Branch_address_1 so that future prefetches to mA will not be associated with Branch_address_1.

Event—Prefetched Cache Line Replacement

Figure 17:
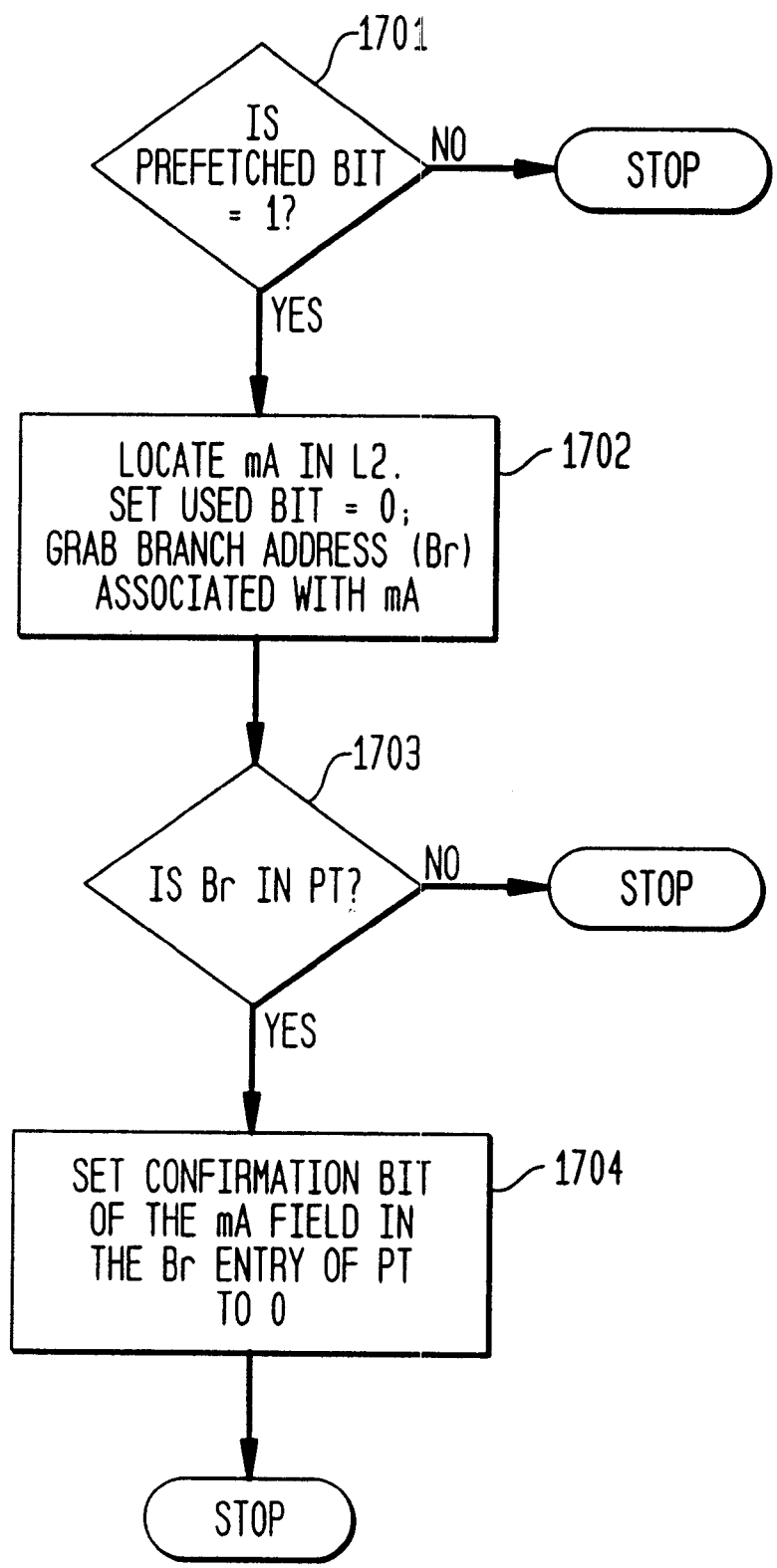
FIG. 17 is a flowchart diagram explaining the actions on replacement of a prefetched line from the L1 cache according to an illustrative embodiment of the present invention.

The behavior of an illustrative embodiment of the present invention in response to a cache line replacement is shown in FIG. 17. If the cache line containing datum mA is replaced to accommodate another line fetched from the L2 cache, the following actions take place to update the L2 cache directory for the line containing datum mA. In step 1701, the prefetched bit of the replaced line is read from the L1 cache directory. If it is set to 1, it means that the line being replaced, was prefetched into the L1 and has not been used after having been prefetched. If it is not set to 1, no actions take place.

Returning to step 1701, if the prefetched bit is set 1, the cache controller sends a signal to the L2 cache directory to search for the line containing datum mA. In step 1702, if mA is present in L2, the used bit of this entry is set to 0. This is used in the future when a new entry for mA is being added to the PT as explained in FIG. 15. The branch address (Br) from the L2 directory is communicated to the prefetch unit. The prefetch unit searches the prefetch table for the branch address (Br) in step 1703. If the branch address is absent in the prefetch table, no actions take place.

Returning to step 1703, if the branch address (Br) is present in the prefetch table, the confirmation bit associated with mA of this entry is set to 0. This implies that future prefetches to mA will not be triggered by the branch (Br).

While preferred embodiments of the invention have been shown and described herein, it will be understood that such embodiments are provided by way of example only. Numerous variations, changes, and substitutions will be apparent to those skilled in the art without departing from the spirit of the invention. Accordingly, it is intended that the appended claims cover all such variations as fall within the spirit and scope of the invention.

We claim:

1. In a system including a high speed buffer logically coupled between memory and at least one processor unit, a method for prefetching information into the high speed buffer for use in processing an instruction stream by the at least one processor unit, the method comprising the steps of:

dynamically generating first path data during run time, wherein the first path data represents a first path that encompasses a prefetch trigger event and an instruction that uses information prefetched by a prefetch operation associated with the prefetch trigger event;

dynamically generating second path data during run time, wherein the second path data represents a predicted second path of execution;

determining whether the first path data is consistent with the second path data; and prefetching instructions and data when the first path data is consistent with the second path data.

2. The method of claim 1, wherein the first path data is output from a first table of entries, wherein each entry identifies i) at least one path that encompasses a given prefetch trigger event; and ii) a given prefetch operation associated with a given prefetch trigger operation.

3. The method of claim 2, wherein each entry of the first table identifies the at least one path that encompasses the given prefetch trigger event with an address field, mask field, and bit field, wherein the address field identifies the given prefetch trigger event, wherein the mask field identifies branch actions for a predetermined number of successive branch instructions that follow the given prefetch trigger event, and wherein the bit field identifies a number of relevant branch actions in the mask field.

4. The method of claim 2, wherein the second path data is output from a second table of entries, wherein each entry identifies at least one predicted path of execution.

5. The method of claim 4, wherein each entry of the second table identifies the at least one predicted path of execution with an address field and mask field, wherein the address field identifies a given instruction, and wherein the mask field identifies branch actions for a predetermined number of successive branch instructions that follow the given instruction.

6. The method of claim 1, wherein the prefetch trigger instruction is derived from previous execution of the event stream.

7. The method of claim 6, wherein the prefetch operation is associated with the prefetch trigger event in response to a miss in the high speed buffer wherein the information used by said event is requested from the high speed buffer and not accessible in the high speed buffer.

8. The method of claim 7, further comprising the step of identifying a particular branch instruction in the event stream that preceded a predetermined number of branch instructions prior to the miss, and wherein the prefetch trigger instruction associated with the prefetch operation is the particular branch instruction.

9. The method of claim 8, wherein the prefetch trigger event is adjusted dynamically based upon execution of the instruction stream.

10. The method of claim 9, further comprising the step of storing timeliness data characterizing accessibility of information prefetched by the prefetch operation when such information used by said event is requested from the high speed buffer.

11. The method of claim 10, wherein the timeliness data encodes one of a first state and a second state, wherein the first state represents that such information prefetched by the prefetch operation is not completely loaded into the high speed buffer, and wherein the second state represents that such information prefetched by the prefetch operation is completely loaded into the high speed buffer.

12. The method of claim 11, further comprising the steps of:
providing a first table of entries, wherein each entry identifies i) at least one path starting from a given prefetch trigger event, and ii) a given prefetch operation associated with a given prefetch trigger operation;
in response to a request to the high speed buffer for said information, determining if the timeliness data encodes said first state; and
in the event that it is determined that the timeliness data encodes said first state,
identifying a given branch instruction in the instruction stream that preceded the prefetch trigger event associated with the prefetch operation that issued the request to the high speed buffer for said information,
updating the first path data to represent a new first path from the given branch instruction to the instruction that uses said information, and
storing an entry in the first table identifying i) the new first path, and ii) the prefetch operation that issued the request to the high speed buffer for said information.

13. The method of claim 1, further comprising the step of storing usefulness data characterizing usefulness of information prefetched by the prefetch operation when such information is stored in said high speed buffer, and wherein the step of conditionally performing the prefetch operation is based upon said usefulness data.

14. The method of claim 1, wherein the second path data is associated with a branch instruction, and wherein the second path data comprises a mask that represents at least one predicted path of execution that follows the associated branch instruction.

15. The method of claim 14, wherein the prefetch trigger event comprises a branch instruction in the instruction stream, and wherein the first path data comprises a mask that represents at least one path of execution from the prefetch trigger event to the instruction that uses the information prefetched by the prefetch trigger event.

16. The method of claim 1, wherein the, prefetch operation prefetches at least one instruction.

17. The method of claim 1, wherein the prefetch operation prefetches data that is operated on by at least one instruction in the instruction stream.

18. In a data processing system including a high speed buffer logically coupled between memory and at least one processor unit, an apparatus for prefetching information into the high speed buffer for use in processing an instruction stream by the at least one processor unit, the apparatus comprising:
prefetch logic for dynamically generating first path data during run time, wherein the first path data represents a first path that encompasses a prefetch trigger event and an instruction that uses information prefetched by a prefetch operation associated with the prefetch trigger event;
branch path prediction logic for dynamically generating second path data during run time, wherein the second path data represents a predicted second path of execution; and
compare logic determining whether the first path data is consistent with the second path data; and
prefetch execution logic for prefetching instructions and data when first path data is consistent with the second path data.

19. The apparatus of claim 18, wherein the first path data is output from a first table of entries, wherein each entry identifies i) at least one path that encompasses a given prefetch trigger event; and ii) a given prefetch operation associated with a given prefetch trigger operation.

20. The apparatus of claim 19, wherein each entry of the first table identifies the at least one path that encompasses the given prefetch trigger event with an address field, mask field, and bit field, wherein the address field identifies the given prefetch trigger event, wherein the mask field identifies branch actions for a predetermined number of successive branch instructions that follow the given prefetch trigger event, and wherein the bit field identifies a number of relevant branch actions in the mask field.

21. The apparatus of claim 19, wherein the second path data is output from a second table of entries, wherein each entry identifies at least one predicted path of execution.

22. The apparatus of claim 21, wherein each entry of the second table identities the at least one predicted path of execution with an address field and mask field, wherein the address field identifies a given instruction, and wherein the mask field identifies branch actions for a predetermined number of successive branch instructions that follow the given instruction.

23. The apparatus of claim 18, wherein the prefetch trigger event is derived from previous execution of the instruction stream.

24. The apparatus of claim 23, wherein the prefetch operation is associated with the prefetch trigger event in response to a miss in the high speed buffer wherein the information used by said event is requested from the high speed buffer and not accessible in the high speed buffer.

25. The apparatus of claim 24, further comprising means for identifying a particular branch instruction in the instruction stream that preceded a predetermined number of branch instructions prior to the miss, and wherein the prefetch trigger event associated with the prefetch operation is the particular branch instruction.

26. The apparatus method of claim 25, wherein the prefetch trigger event is adjusted dynamically based upon execution of the instruction stream.

27. The apparatus of claim 26, further comprising means for storing timeliness data characterizing accessibility of information prefetched by the prefetch operation when such information used by said event is requested from the high speed buffer.

28. The apparatus of claim 27, wherein the timeliness data encodes one of a first state and a second state, wherein the first state represents that such information prefetched by the prefetch operation is not completely loaded into the high speed buffer, and wherein the second state represents that such information prefetched by the prefetch operation is completely loaded into the high speed buffer.

29. The apparatus of claim 28, further comprising:

a first table of entries, wherein each entry identifies i) at least one path starting from a given prefetch trigger event, and ii) a given prefetch operation associated with a given prefetch trigger operation;

means, in response to a request to the high speed buffer for said information, for determining if the timeliness data encodes said first state; and means, in the event that it is determined that the timeliness data encodes said first state, for identifying a given branch instruction in the instruction stream that preceded the prefetch trigger event associated with the prefetch operation that issued the request to the high speed buffer for said information, updating the first path data to represent a new first path from the given branch instruction to the instruction that uses said information, and storing an entry in the first table identifying i) the new first path, and ii) the prefetch operation that issued the request to the high speed buffer for said information.

30. The apparatus of claim 18, further comprising means for storing usefulness data characterizing usefulness of information prefetched by the prefetch operation when such information is stored in said high speed buffer, and wherein the prefetch execution logic conditionally performs the prefetch operation based upon said usefulness data.

31. The apparatus of claim 18, wherein the second path data is associated with a branch instruction, and wherein the second path data comprises a mask that represents at least one predicted path of execution that follows the associated branch instruction.

32. The apparatus of claim 31, wherein the prefetch trigger event comprises a branch instruction in the instruction stream, and wherein the first path data comprises a mask that represents at least one path of execution from the prefetch trigger event to the instruction that uses the information prefetched by the prefetch trigger event.

33. The apparatus of claim 18, wherein the prefetch operation prefetches at least one instruction.

34. The apparatus of claim 18, wherein the prefetch operation prefetches data that is operated on by at least one instruction in the instruction stream.

* * * * *